United States Patent
Damnjanovic et al.

(10) Patent No.: US 9,515,808 B2
(45) Date of Patent: Dec. 6, 2016

(54) TRANSMISSION OF CONTROL INFORMATION IN A WIRELESS NETWORK WITH CARRIER AGGREGATION

(75) Inventors: Jelena M. Damnjanovic, Del Mar, CA (US); Wanshi Chen, San Diego, CA (US); Juan Montojo, Nuremberg (DE); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 13/558,110

(22) Filed: Jul. 25, 2012

(65) Prior Publication Data

US 2013/0028205 A1 Jan. 31, 2013

Related U.S. Application Data

(60) Provisional application No. 61/511,932, filed on Jul. 26, 2011.

(51) Int. Cl.
*H04L 5/00* (2006.01)
*H04L 5/14* (2006.01)

(52) U.S. Cl.
CPC .............. *H04L 5/0091* (2013.01); *H04L 5/001* (2013.01); *H04L 5/0055* (2013.01);
(Continued)

(58) Field of Classification Search
CPC ...... H04L 5/001; H04L 5/0057; H04L 5/0058; H04L 5/0055; H04L 5/0091; H04L 5/14; H04L 5/0078; H04L 5/0023; H04L 5/0048; H04L 5/0053; H04L 1/1812; H04L 1/1887; H04L 1/0026; H04L 1/1671; H04L 5/0007; H04W 72/0413; H04W 72/1231; H04W 72/1268; H04W 72/1289; H04W 88/08; H04W 72/042; H04W 72/0446; H04W 88/02; H04W 72/12; H04W 52/34; H04W 52/146; H04W 52/325; H04W 72/1273
See application file for complete search history.

(56) References Cited

U.S. PATENT DOCUMENTS 8,855,042 B2 * 10/2014 Yuan .................... H04L 1/1854
370/279
2009/0241004 A1 * 9/2009 Ahn et al. .................... 714/749
(Continued)

FOREIGN PATENT DOCUMENTS

CN 101772179 A 7/2010
CN 102075309 A 5/2011
(Continued)

OTHER PUBLICATIONS

International Search Report and Written Opinion—PCT/US2012/048318—ISA/EPO—Feb. 4, 2013.
(Continued)

*Primary Examiner* — Yee Lam
(74) *Attorney, Agent, or Firm* — Patterson & Sheridan, L.L.P.

(57) ABSTRACT

Techniques for sending control information to support operation on multiple component carriers (CCs) are disclosed. A user equipment (UE) may be configured with multiple CCs for carrier aggregation. The multiple CCs may be associated with different uplink-downlink configurations and may have different downlink subframes and uplink subframes. In one aspect, uplink control information (UCI) for a secondary CC (SCC) may be sent on a primary CC (PCC) based on a UCI transmission timeline for the PCC (and not based on a UCI transmission timeline for the SCC). For example, a downlink grant for the SCC may be sent based on a downlink grant transmission timeline for the PCC. In another aspect, uplink grants for an SCC may be sent on the PCC based on an uplink grant transmission timeline for the PCC (and not based on an uplink grant transmission timeline for the SCC).

78 Claims, 25 Drawing Sheets

(52) U.S. Cl.
CPC .......... *H04L 5/0057* (2013.01); *H04L 5/0058* (2013.01); *H04L 5/0078* (2013.01); *H04L 5/14* (2013.01)

(56) References Cited

U.S. PATENT DOCUMENTS

| | | | |
|---|---|---|---|
| 2010/0080166 A1* | 4/2010 | Palanki et al. | 370/315 |
| 2010/0172308 A1* | 7/2010 | Nam et al. | 370/329 |
| 2011/0216676 A1* | 9/2011 | Li | H04L 1/1812 370/281 |
| 2011/0243102 A1 | 10/2011 | Sebire et al. | |
| 2011/0274043 A1* | 11/2011 | Nam et al. | 370/328 |
| 2012/0039275 A1 | 2/2012 | Chen et al. | |
| 2012/0127931 A1 | 5/2012 | Gaal et al. | |
| 2012/0127950 A1* | 5/2012 | Chung et al. | 370/329 |
| 2012/0257554 A1* | 10/2012 | Kim et al. | 370/280 |
| 2013/0034073 A1* | 2/2013 | Aiba et al. | 370/329 |
| 2013/0084907 A1* | 4/2013 | Shen | H04W 72/082 455/501 |
| 2013/0153298 A1* | 6/2013 | Pietraski et al. | 175/45 |
| 2013/0336299 A1* | 12/2013 | Lee | H04L 5/0007 370/336 |
| 2014/0064237 A1* | 3/2014 | Lee | H04L 5/0055 370/329 |
| 2014/0112263 A1* | 4/2014 | Lee et al. | 370/329 |
| 2015/0110026 A1* | 4/2015 | Lee | H04B 7/2656 370/329 |
| 2015/0180616 A1* | 6/2015 | Lee | H04L 1/1812 370/329 |

FOREIGN PATENT DOCUMENTS

| | | | |
|---|---|---|---|
| CN | 102076072 A | 5/2011 | |
| CN | 102088343 A | 6/2011 | |
| JP | 2014521260 A | 8/2014 | |
| KR | 20090098651 A | 9/2009 | |
| KR | 20110073689 A | 6/2011 | |
| RU | 2008106618 A | 8/2009 | |
| WO | 2010077051 A2 | 7/2010 | |
| WO | WO-2010077051 A3 | 8/2010 | |
| WO | 2011078581 A2 | 6/2011 | |
| WO | WO 2011078581 A2 * | 6/2011 | 370/280 |
| WO | WO2011132721 A1 | 10/2011 | |
| WO | WO-2012112008 A2 | 8/2012 | |
| WO | WO-2013007152 A1 | 1/2013 | |

OTHER PUBLICATIONS

Ericsson et al: "TDD ACK/NACK on PUCCH", 3GPP Draft; R1-105685, 3rd Generation Partnership Project (3GPP), Mobile Competence Centre ; 650, Route Des Lucioles ; F-06921 Sophia-Antipolis Cedex ; France, vol. RAN WG1, no. Xi'an; 20101011, Oct. 5, 2010, XP050450712, [retrieved on Oct. 5, 2010].

ITU-R AD HOC: "LTE-Advanced" material for Rec. ITU-R M. [IMT. RSPEC]", 3GPP Draft; RT-110016, 3rd Generation Partnership Project (3GPP), Mobile Competence Centre ; 650, Route Des Lucioles ; F-06921 Sophia-Antipolis Cedex ; France, vol. RAN WG2, no. Dublin, Ireland; 20110117, Jan. 18, 2011, XP050493096, [retrieved on Jan. 18, 2011].

Partial International Search Report—PCT/US2012/048318—ISA/EPO—Nov. 5, 2012.

"3rd-Generation Partnership Project; Techincal Specification Group Radio Access Network; Evolved Universal Terrestrial Radio Access (E-UTRA); Physical Layer Procedures (Release 10)", 3GPP Standard; 3GPP TS 36.213, 3rd Generation Partnership Project (3GPP), Mobile Competence Centre; 650, Route Des Lucioles; F-06921 Sophia-Antipolis Cedex; France, vol. RAN WG1, No. V10.2.0, Jun. 22, 2011, pp. 1-120, XP050553381.

Huawei: "HARQ-ACK on PUSCH for TDD with channel selection configured for 2 serving cells", 3GPP TSG RAN WG1 Meeting #65, R1-112011, May 2011, 6 Pages.

Nokia Siemens Networks: "Cell specific TDD configuration with inter-band CA", 3GPP TSG-RAN WG2 Meeting #74, R2-112946, May 2011, 4 Pages.

* cited by examiner

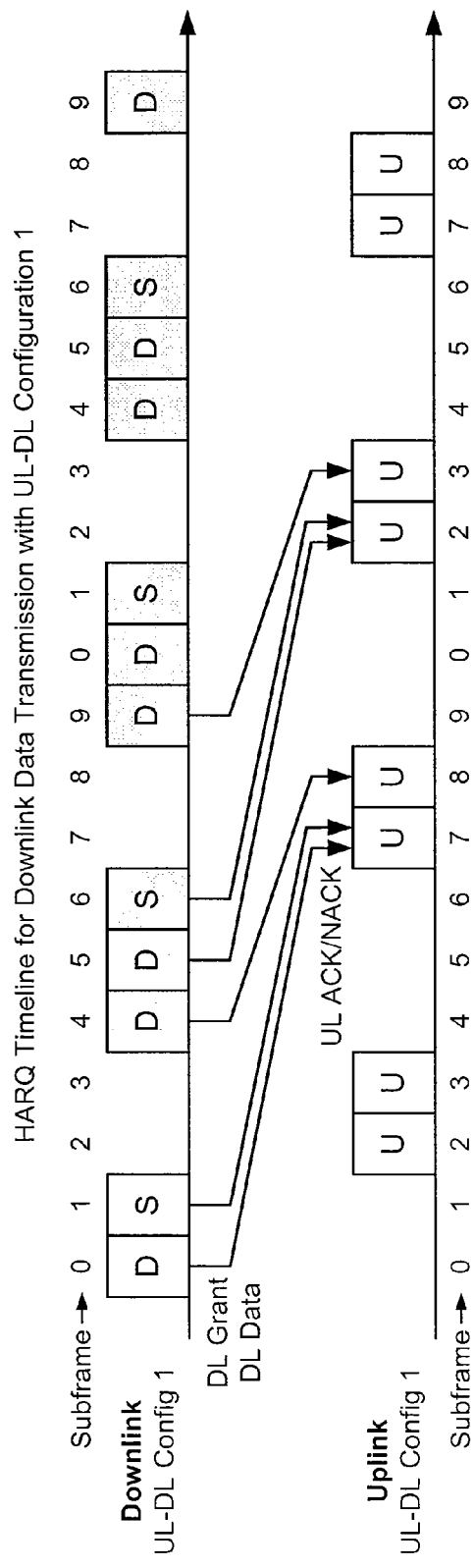
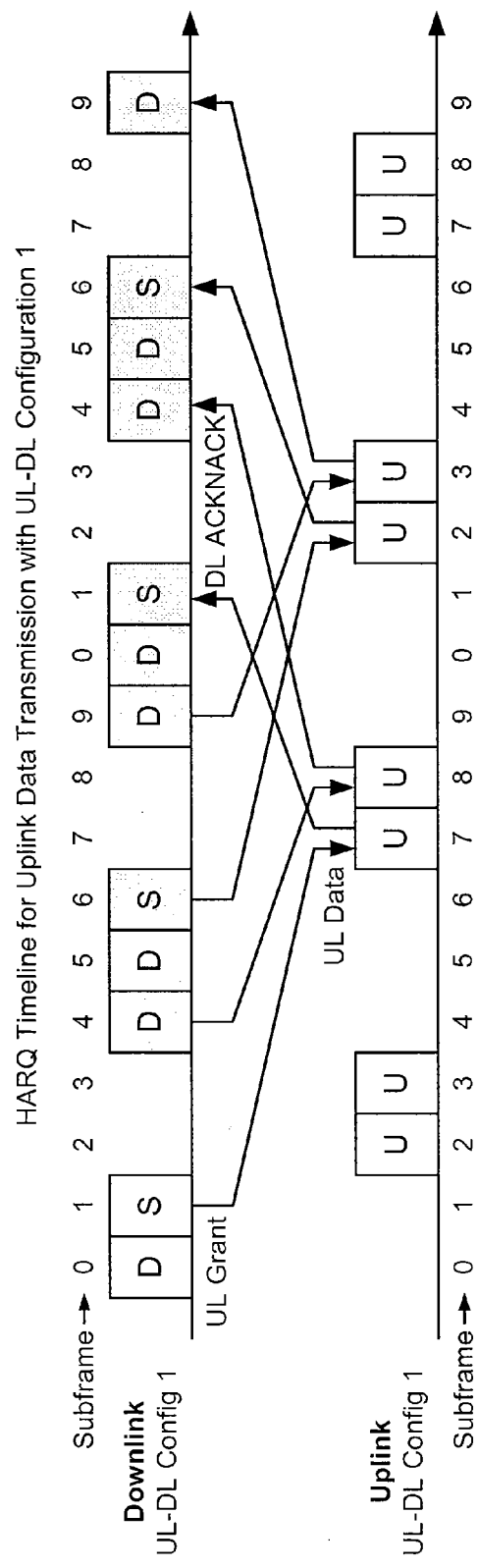
FIG. 4A
FIG. 4B

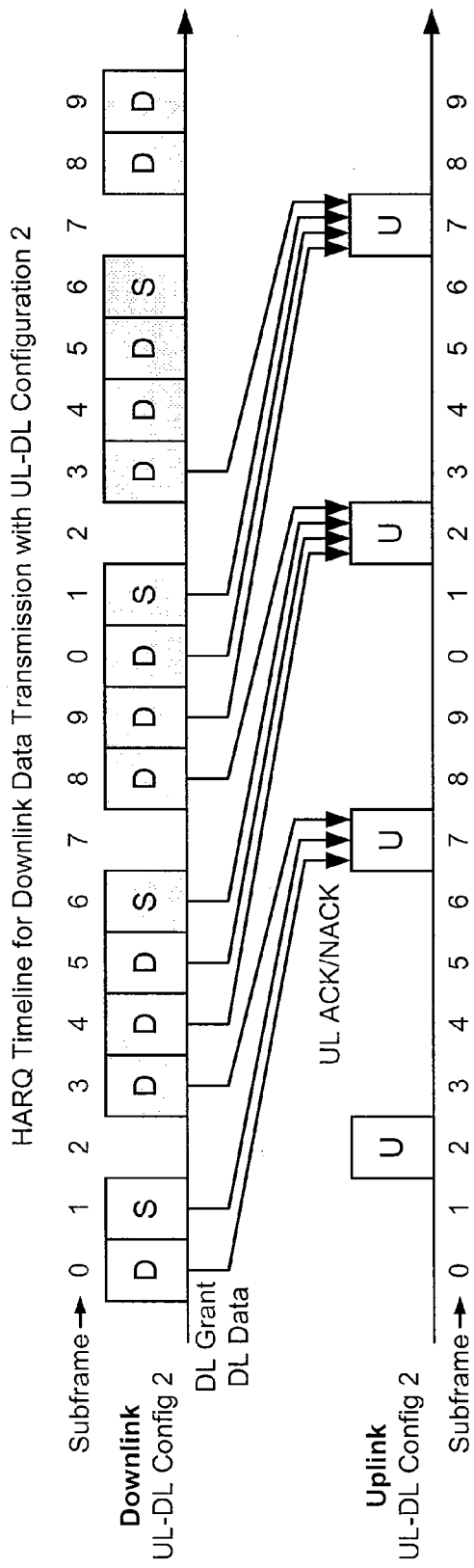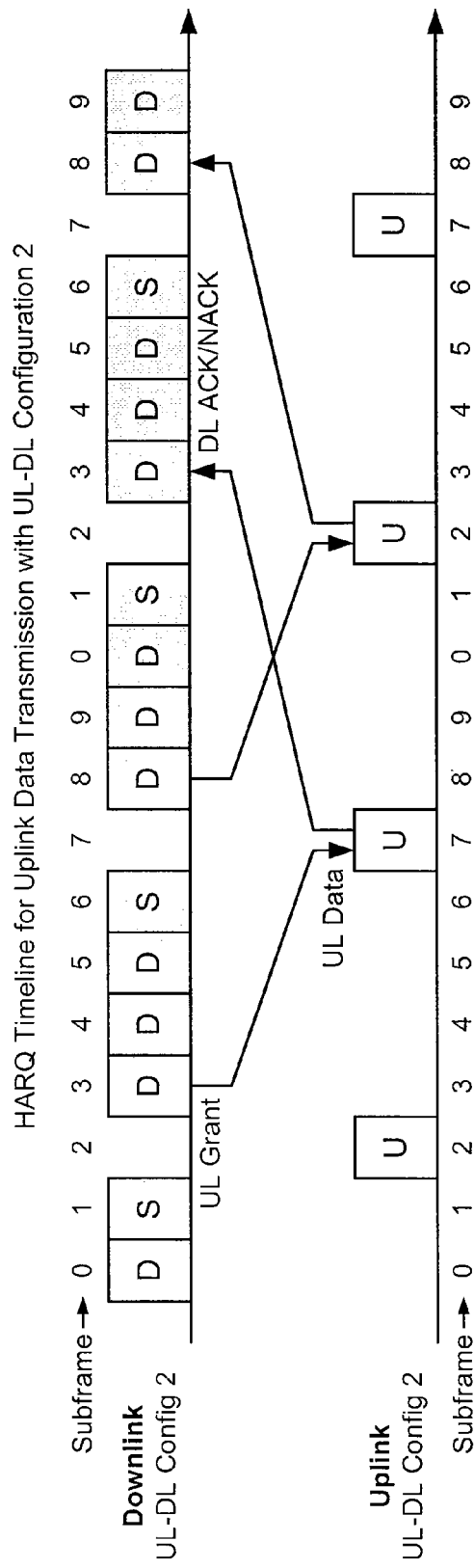

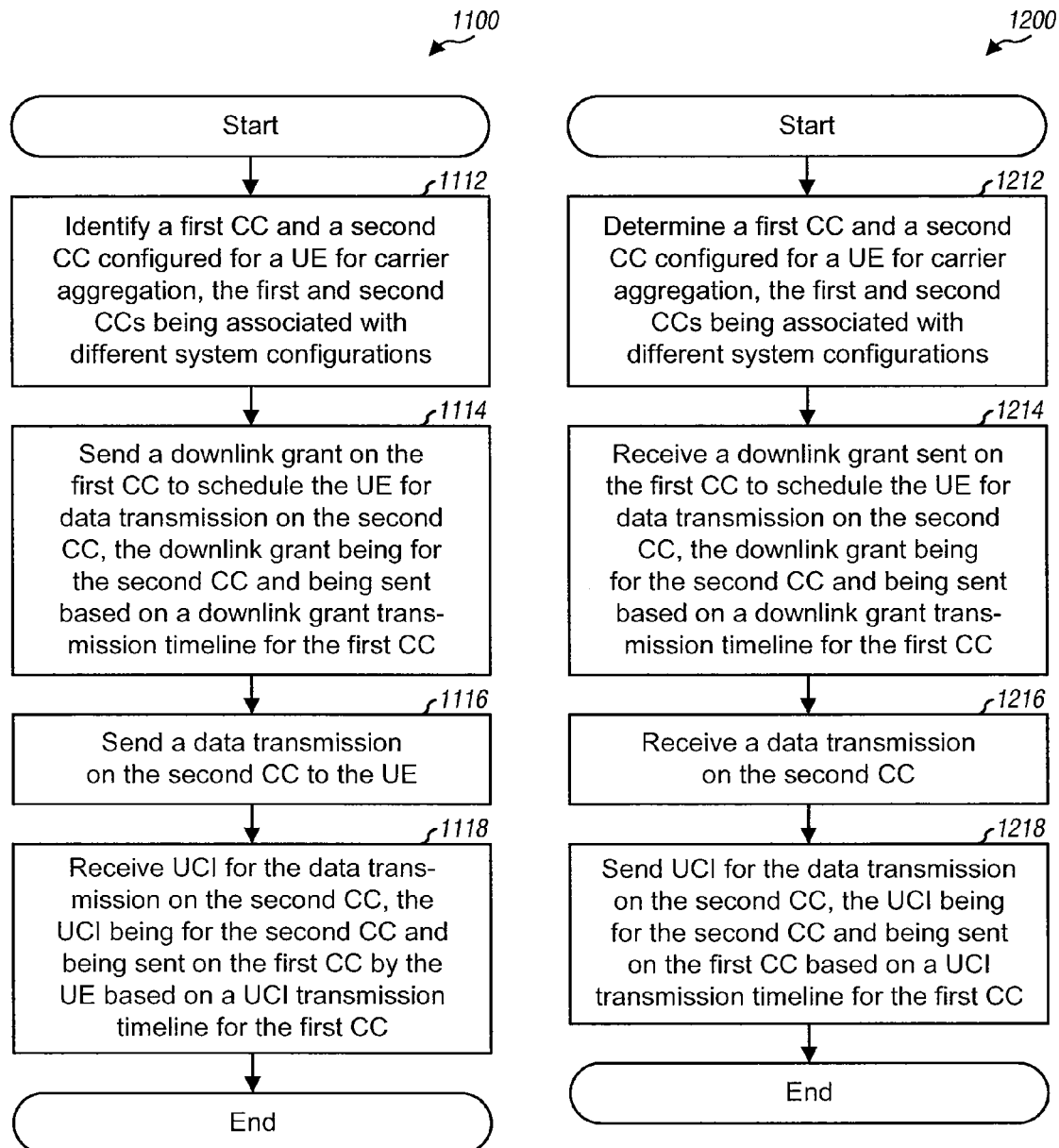

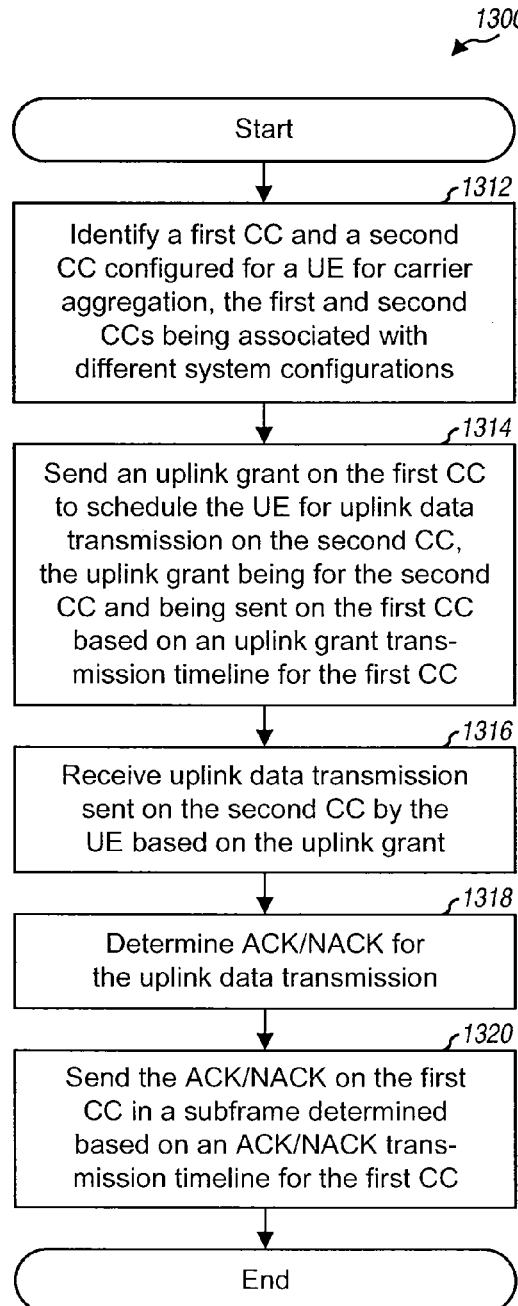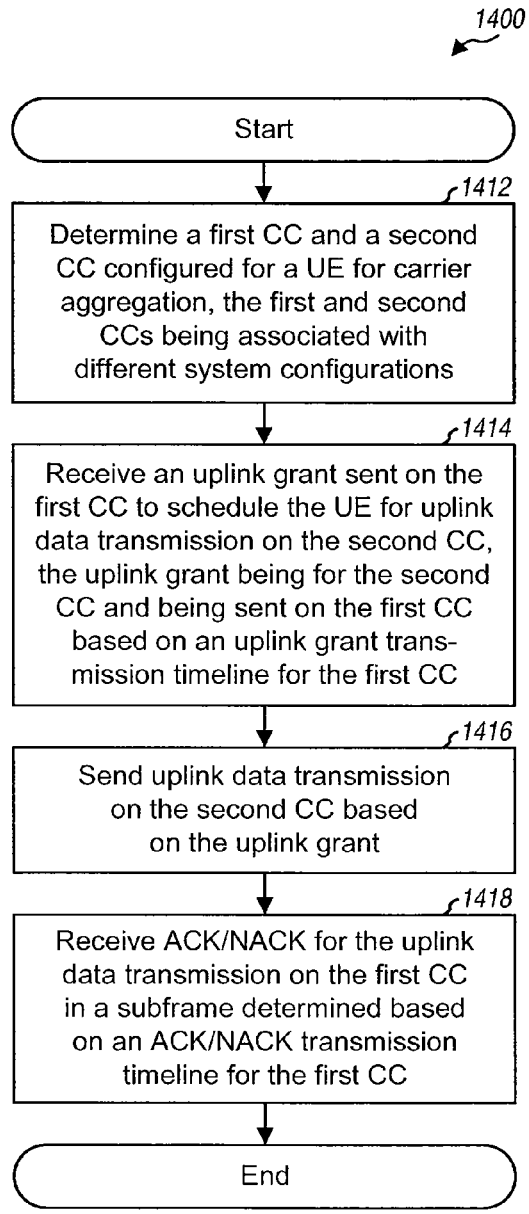
FIG. 13
FIG. 14

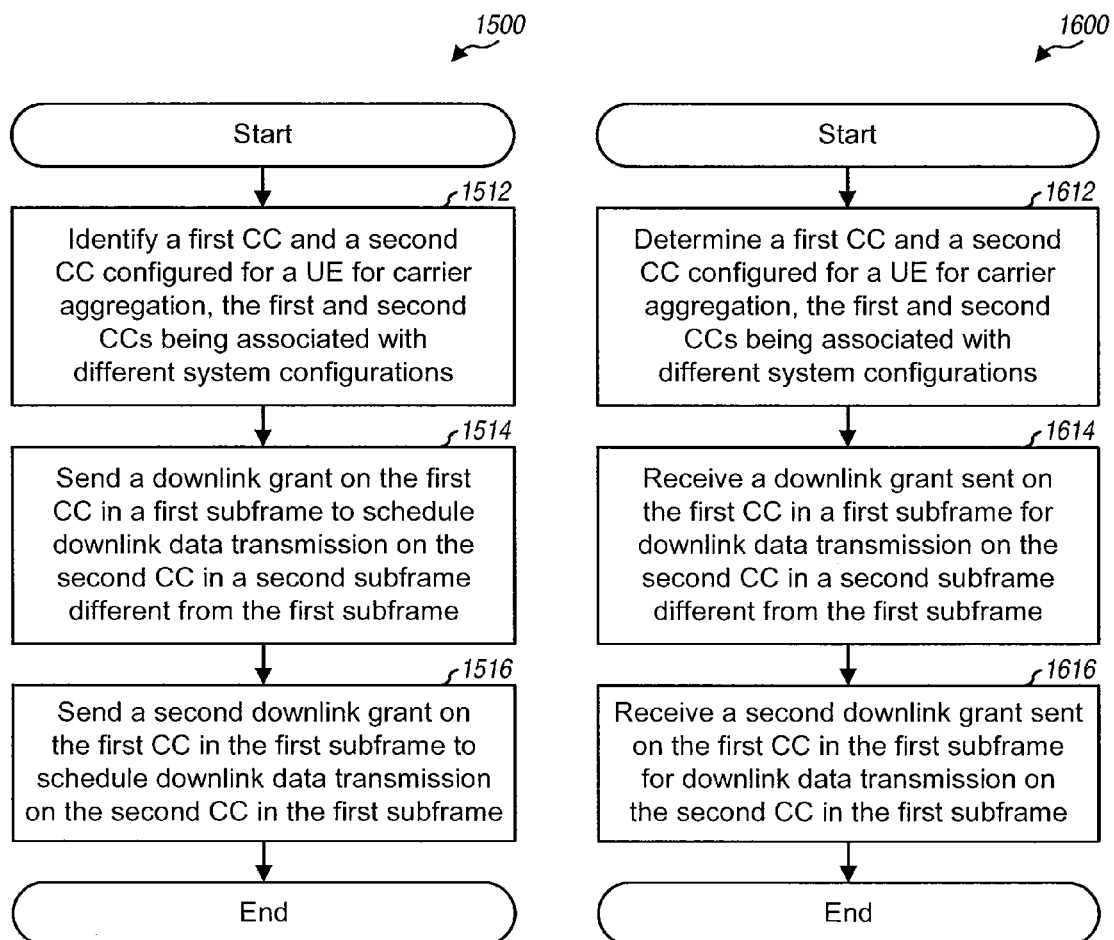

TRANSMISSION OF CONTROL INFORMATION IN A WIRELESS NETWORK WITH CARRIER AGGREGATION

CLAIM OF PRIORITY UNDER 35 U.S.C. §119

The present application for Patent claims priority to Provisional U.S. Application Ser. No. 61/511,932, entitled "TRANSMISSION OF CONTROL INFORMATION IN A TDD SYSTEM WITH CARRIER AGGREGATION," filed Jul. 26, 2011, assigned to the assignee hereof, and expressly incorporated herein by reference.

BACKGROUND

I. Field

The present disclosure relates generally to communication, and more specifically to techniques for transmitting control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple component carriers (CCs). A CC may refer to a range of frequencies used for communication and may be associated with certain characteristics. For example, a CC may be associated with system information describing operation on the CC. A CC may also be referred to as a carrier, a frequency channel, a cell, etc. A base station may send data and downlink control information (DCI) on one or more CCs to a UE. The UE may send data and uplink control information (UCI) on one or more CCs to the base station.

SUMMARY

Techniques for sending control information to support operation on multiple CCs are disclosed herein. A UE may be configured with multiple CCs for carrier aggregation. One CC may be designated as a primary CC (PCC) for the UE. Each remaining CC may be considered as a secondary CC (SCC) for the UE. The multiple CCs may be associated with different uplink-downlink configurations and may have different downlink subframes and uplink subframes.

In one aspect of the present disclosure, UCI for an SCC may be sent on the PCC based on a UCI transmission timeline for the PCC (and not based on a UCI transmission timeline for the SCC). In one design, a base station may identify a first CC and a second CC configured for a UE for carrier aggregation, with the first and second CCs being associated with different system configurations, e.g., different uplink-downlink configurations. The base station may send a downlink grant on the first CC to schedule the UE for data transmission on the second CC. The downlink grant may be for the second CC and may be sent based on a downlink grant transmission timeline for the first CC. The eNB may send data transmission on the second CC to the UE. The eNB may receive UCI for the data transmission on the second CC. The UCI may be for the second CC and may be sent on the first CC by the UE based on a UCI transmission timeline for the first CC.

In another aspect of the present disclosure, uplink grants for an SCC may be sent on the PCC based on an uplink grant transmission timeline for the PCC (and not based on an uplink grant transmission timeline for the SCC). In one design, a base station may identify a first CC and a second CC configured for a UE for carrier aggregation, with the first and second CCs being associated with different system configurations, e.g., different uplink-downlink configurations. The eNB may send an uplink grant on the first CC to schedule the UE for uplink data transmission on the second CC. The uplink grant may be for the second CC and may be sent on the first CC based on an uplink grant transmission timeline for the first CC. The eNB may receive uplink data transmission sent on the second CC by the UE based on the uplink grant. The eNB may determine acknowledgement/negative acknowledgement (ACK/NACK) for the uplink data transmission. The eNB may send the ACK/NACK on the first CC in a subframe determined based on an ACK/NACK transmission timeline for the first CC.

Various aspects and features of the disclosure are described in further detail below.

BRIEF DESCRIPTION OF THE DRAWINGS

FIGS. 4A and 4B show data transmission on the downlink and uplink, respectively, on a CC with uplink-downlink configuration 1.

FIGS. 5A and 5B show data transmission on the downlink and uplink, respectively, on a CC with uplink-downlink configuration 2.

FIGS. 11 to 22 show various processes for operating on multiple CCs and various processes for supporting operation on multiple CCs.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are recent releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below. In the description herein, the term "LTE" generically refers to all releases of LTE unless noted otherwise.

Figure 1:
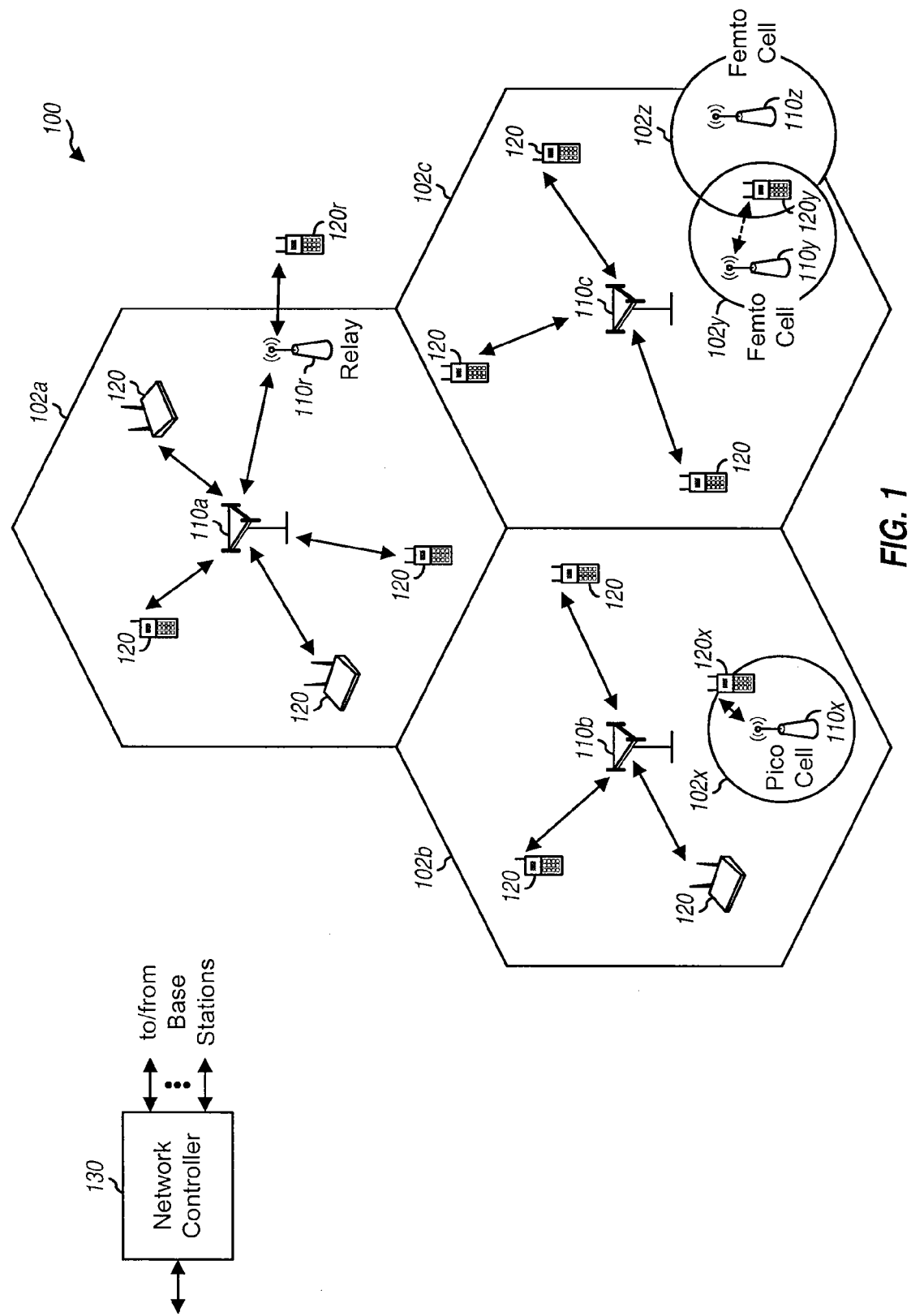
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. An eNB 110x may be a pico eNB for a pico cell 102x. eNBs 110y and 110z may be home eNBs for femto cells 102y and 102z, respectively. An eNB may support one or multiple (e.g., three) cells.

Wireless network 100 may also include relays. A relay may be an entity that receives a transmission of data from an upstream station (e.g., an eNB or a UE) and sends a transmission of the data to a downstream station (e.g., a UE or an eNB). A relay may also be a UE that relays transmissions for other UEs. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 (e.g., 120x, 120y, etc.) may be dispersed throughout wireless network 100, and each UE may be stationary or mobile. A UE may also be referred to as a terminal, a mobile station, a subscriber unit, a station, etc. A UE may be a cellular phone, a smartphone, a tablet, a netbook, a smart book, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, other UEs, etc.

Wireless network 100 may support hybrid automatic retransmission (HARQ) in order to improve reliability of data transmission. For HARQ, a transmitter (e.g., an eNB) may send a transmission of a transport block and may send one or more additional transmissions, if needed, until the transport block is decoded correctly by a receiver (e.g., a UE), or the maximum number of transmissions has been sent, or some other termination condition is encountered. A transport block may also be referred to as a packet, a codeword, etc. For synchronous HARQ, all transmissions of the transport block may be sent in subframes of a single HARQ interlace, which may include evenly spaced subframes. For asynchronous HARQ, each transmission of the transport block may be sent in any subframe.

Wireless network 100 may utilize FDD and/or TDD. For FDD, the downlink and uplink may be allocated separate frequency channels, and downlink transmissions and uplink transmissions may be sent concurrently on the separate frequency channels. For TDD, the downlink and uplink may share the same frequency channel, and downlink and uplink transmissions may be sent on the same frequency channel in different time periods. In the description herein, an FDD CC is a CC utilizing FDD, and a TDD CC is a CC utilizing TDD.

Figure 2:
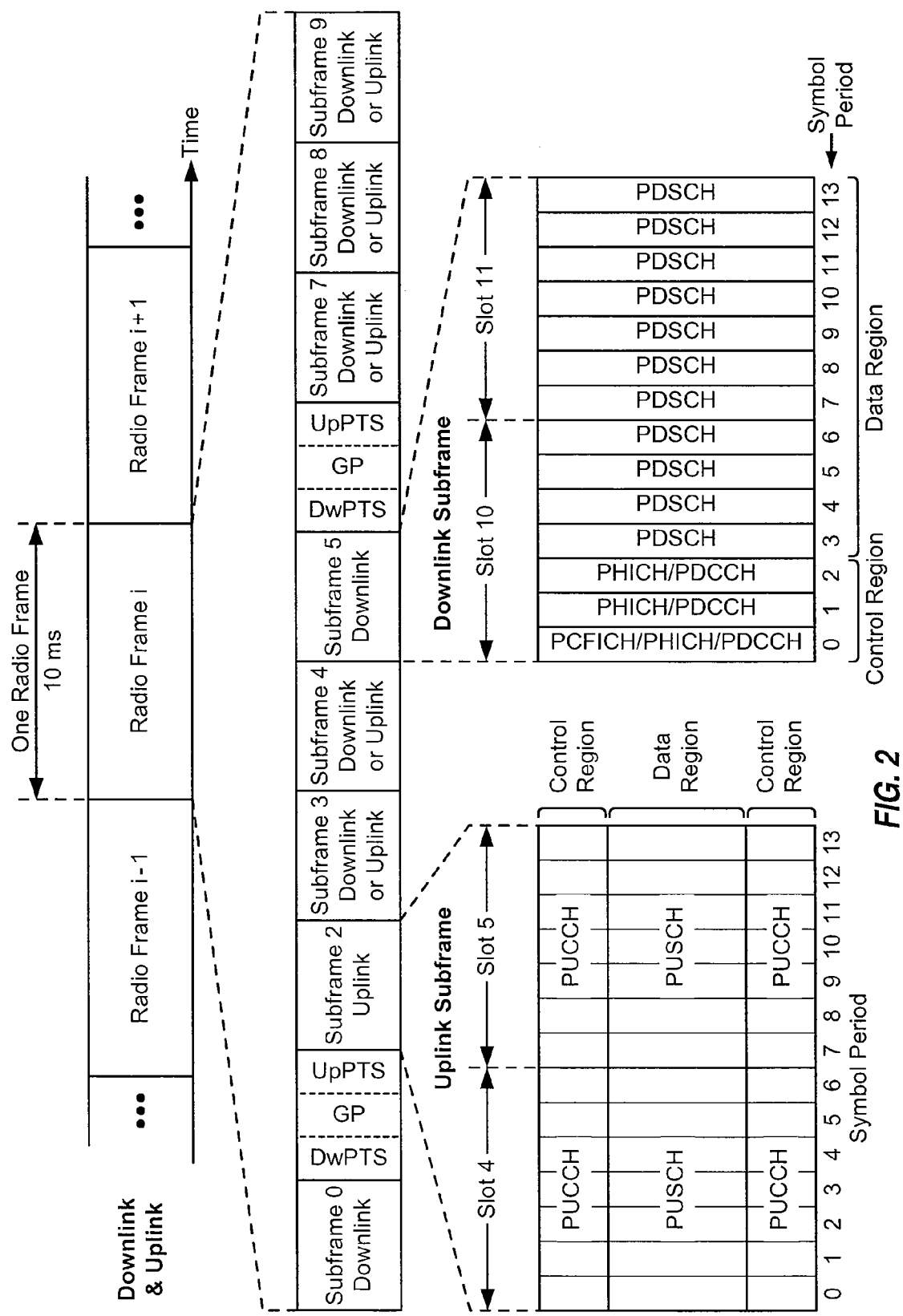
FIG. 2 shows an exemplary frame structure.

FIG. 2 shows an exemplary frame structure for TDD in LTE. The transmission timeline for the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1. The available time frequency resources may be partitioned into resource blocks. Each resource block may cover 12 subcarriers in one slot.

LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes three special fields composed of (i) a Downlink Pilot Time Slot (DwPTS) used for downlink control channels as well as data transmissions, (ii) a Guard Period (GP) of no transmission, and (iii) an Uplink Pilot Time Slot (UpPTS) used for either a Random Access Channel (RACH) or sounding reference signals (SRS). Subframe 6 may include only the DwPTS, or all three special fields, or a downlink subframe depending on the uplink-downlink configuration. The DwPTS, GP and UpPTS may have different durations for different subframe configurations. A subframe used for the downlink may be referred to as a downlink subframe, and a subframe used for the uplink may be referred to as an uplink subframe.

Table 1 lists seven uplink-downlink configurations supported by LTE for TDD. Each uplink-downlink configuration indicates whether each subframe is a downlink subframe (denoted as "D" in Table 1), or an uplink subframe (denoted as "U" in Table 1), or a special subframe (denoted as "S" in Table 1). As shown in Table 1, uplink-downlink configurations 1 through 5 are downlink heavy, which means that there are more downlink subframes than uplink subframes in each radio frame. Uplink-downlink configuration 6 is uplink heavy, which means that there is more uplink subframes than downlink subframes in each radio frame.

TABLE 1

Uplink-Downlink Configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As shown in FIG. 2, a downlink subframe may include a control region time division multiplexed (TDM) with a data region. The control region may occupy the first M symbol periods of a subframe, where M may be 1, 2, 3 or 4 and may change from subframe to subframe. The data region may occupy the remaining symbol periods of a subframe.

An uplink subframe may include a control region frequency division multiplexed (FDM) with a data region. The control region may occupy resource blocks near the two edges of the system bandwidth. The data region may occupy the remaining resource blocks in the middle of the system bandwidth.

As shown in FIG. 2, on the downlink in LTE, an eNB may transmit a Physical Control Format Indicator Channel (PCFICH), a Physical HARQ Indicator Channel (PHICH), a Physical Downlink Control Channel (PDCCH), and/or other physical channels in the control region of a subframe. The PCFICH may convey the size of the control region. The PHICH may carry ACK/NACK for data transmission sent on the uplink with HARQ. The PDCCH may carry downlink control information (DCI) such as downlink grants, uplink grants, etc. The eNB may transmit a Physical Downlink Shared Channel (PDSCH) and/or other physical channels in the data region of a subframe. The PDSCH may carry data for UEs scheduled for data transmission on the downlink.

As also shown in FIG. 2, on the uplink in LTE, a UE may transmit a Physical Uplink Control Channel (PUCCH) in the control region of a subframe or a Physical Uplink Shared Channel (PUSCH) in the data region of the subframe. The PUCCH may carry uplink control information (UCI) such as ACK/NACK for data transmission sent on the downlink with HARQ, channel state information (CSI) to support data transmission on the downlink, etc. The PUSCH may carry only data or both data and UCI.

The various signals and channels in LTE are described in 3GPP TS 36.211, entitled "Evolved Universal Terrestrial Radio Access (E-UTRA); Physical Channels and Modulation," which is publicly available.

Figure 3A:
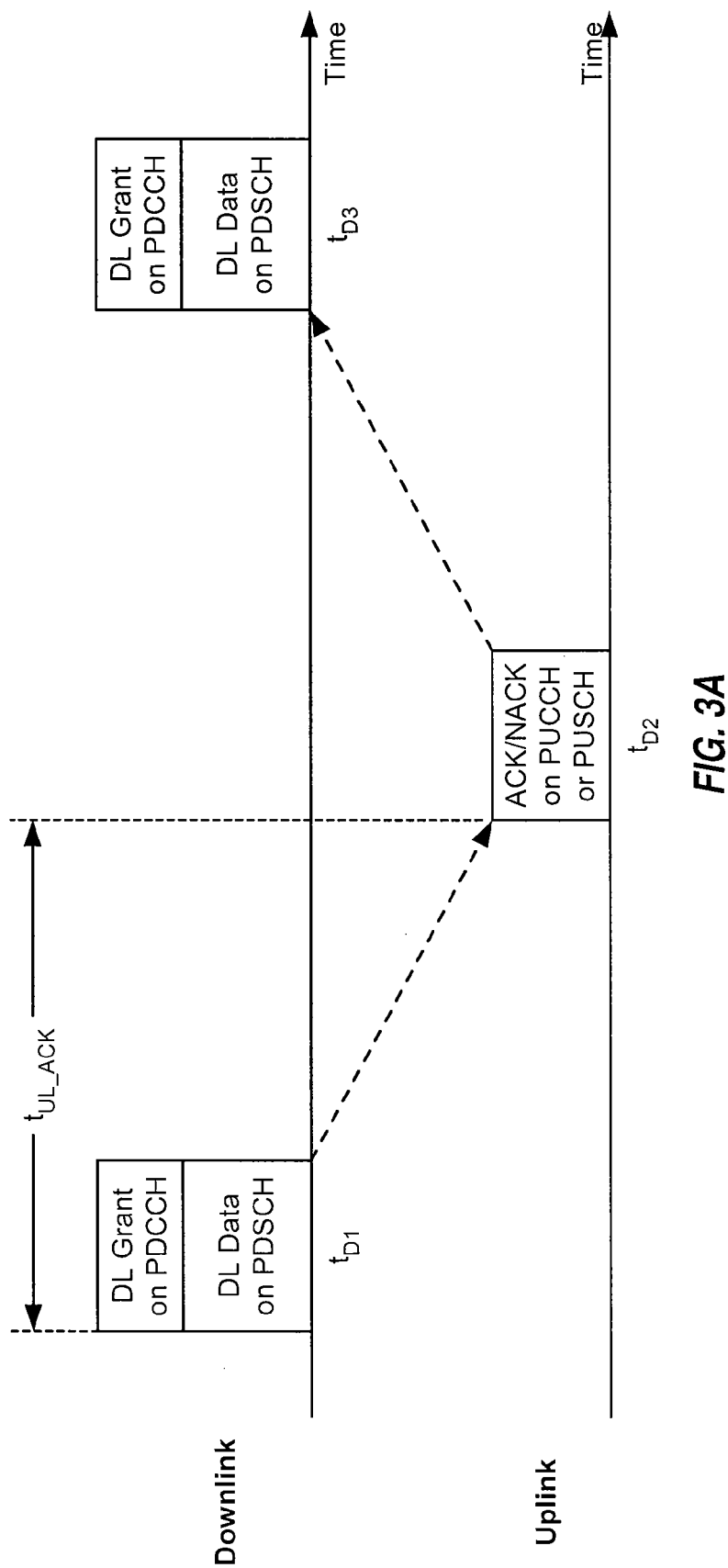
FIG. 3A shows an example of data transmission on the downlink with HARQ.

FIG. 3A shows an example of data transmission on the downlink with HARQ. An eNB may schedule a UE for data transmission on the downlink. The eNB may send a downlink (DL) grant on the PDCCH and a data transmission of one or more transport blocks on the PDSCH to the UE in subframe $t_{D1}$. The UE may receive the downlink grant and may process (e.g., demodulate and decode) the data transmission received on the PDSCH based on the downlink grant. The UE may determine ACK/NACK based on whether each transport block is decoded correctly or in error. The ACK/NACK may also be referred to as ACK/NACK feedback, HARQ feedback, etc. The ACK/NACK may include an ACK for each transport block decoded correctly and a NACK for each transport block decoded in error. The ACK/NACK may also include other information. The UE may send the ACK/NACK on the PUCCH or PUSCH to the eNB in subframe $t_{D2}$. The eNB may receive the ACK/NACK from the UE. The eNB may terminate transmission of each transport block decoded correctly and may send another transmission of each transport block decoded in error by the UE in subframe $t_{D3}$.

Figure 3B:
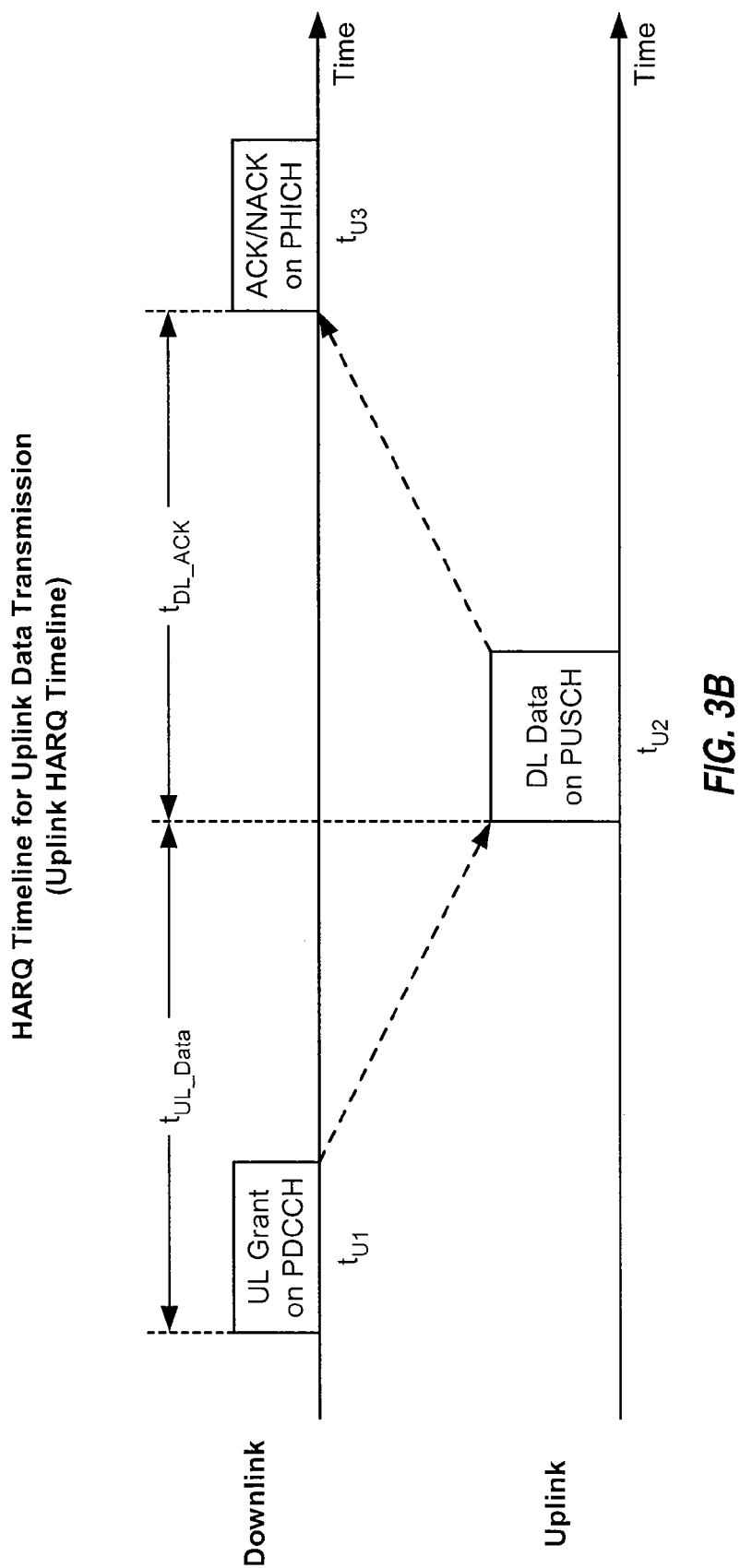
FIG. 3B shows an example of data transmission on the uplink with HARQ.

FIG. 3B shows an example of data transmission on the uplink with HARQ. An eNB may schedule a UE for data transmission on the uplink. The eNB may send an uplink (UL) grant on the PDCCH to the UE in subframe $t_{U1}$. The UE may receive the uplink grant and may send a data transmission of one or more transport blocks on the PUSCH in subframe $t_{U2}$. The eNB may process (e.g., demodulate and decode) the data transmission received on the PUSCH based on the uplink grant. The eNB may determine ACK/NACK based on whether each transport block is decoded correctly or in error. The eNB may send the ACK/NACK on the PHICH to the UE in subframe $t_{U3}$. The eNB may schedule the UE for data transmission of each transport block decoded in error by the eNB (not shown in FIG. 3B).

As shown in FIGS. 3A and 3B, data may be sent on a given CC based on an HARQ timeline applicable for the CC, which may be dependent on the downlink subframes and uplink subframes available for the CC. For data transmission on the downlink shown in FIG. 3A, a base station/eNB may send a downlink grant and data in downlink subframe $t_{D1}$, and a UE may send ACK/NACK in uplink subframe $t_{D2}=t_{D1}+T_{UL\_ACK}$, where $T_{UL\_ACK}=4$ for FDD and $T_{UL\_ACK} \geq 4$ for TDD in LTE Release 10. For data transmission on the uplink shown in FIG. 3B, the base station may send an uplink grant in downlink subframe $t_{U1}$, the UE may send data in uplink subframe $t_{U2}=t_{U1}+T_{UL\_Data}$, and the base station may send ACK/NACK in subframe $t_{U3}=t_{U2}+T_{DL\_ACK}$, where $T_{UL\_Data}=T_{DL\_ACK}=4$ for FDD, and $T_{UL\_Data} \geq 4$ and $T_{DL\_ACK} \geq 4$ for TDD in LTE Release 10.

For an FDD CC, a downlink subframe and an uplink subframe are both available in each 1 ms period, and ACK/NACK may be sent 4 subframes after data transmission. For a TDD CC, either a downlink subframe or an uplink subframe is available in each 1 ms period, and ACK/NACK may be sent on the downlink (or uplink) in the first available subframe for the downlink (or uplink) that is at least 4 subframes after data transmission.

For TDD, each uplink subframe of each uplink-downlink configuration may be associated with a specific HARQ timeline for data transmission on the uplink, which may be referred to as an uplink HARQ timeline. The uplink HARQ timeline for each uplink subframe indicates (i) a specific downlink subframe in which to send an uplink grant on the PDCCH and (ii) a specific downlink subframe in which to send ACK/NACK on the PHICH to support data transmission on the PUSCH in that uplink subframe. As shown in FIG. 3B, an uplink grant may be transmitted on the PDCCH in a downlink subframe that is $n_{UL\_Data}$ subframes earlier than an uplink subframe on which data is transmitted on the PUSCH.

Table 2 lists the values of $n_{UL\_Data}$ for different downlink subframes in which uplink grants may be sent on the PDCCH for the seven uplink-downlink configurations shown in Table 1. As an example, for uplink-downlink configuration 0, an uplink grant may be sent on the PDCCH (i) in downlink subframe 0 to support data transmission on the PUSCH in uplink subframe 4 or (ii) in downlink subframe 1 to schedule data transmission on the PUSCH in uplink subframe 7. For uplink-downlink configurations 1 through 5, more downlink subframes are available to send DCI than uplink subframes available to send data. Hence, some downlink subframes are not utilized to send uplink grants.

TABLE 2

$n_{UL\_Data}$ for Uplink HARQ Timeline

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | | 4 | | | 6 | | 4 |
| 2 | | | 4 | | | | | 4 | | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

As also shown in FIG. 3B, ACK/NACK may be sent on the PHICH in a downlink subframe that is $n_{DL\_ACK}$ subframes later than an uplink subframe in which data is transmitted on the PUSCH, where $n_{DL\_ACK} \geq 4$ in LTE Release 10. Table 3 lists the values of $n_{DL\_ACK}$ for different downlink subframes in which ACK/NACK may be sent on the PHICH for the seven uplink-downlink configurations shown in Table 1. As an example, for uplink-downlink configuration 0, ACK/NACK may be sent on the PHICH (i) in downlink subframe 5 for data transmission sent on the PUSCH in uplink subframe 8 of the previous radio frame or (ii) in downlink subframe 6 for data transmission sent on the PUSCH in uplink subframe 2. A subframe in which ACK/NACK can be sent on the PHICH may be referred to as a PHICH subframe, a non-zero PHICH subframe, etc. The PHICH subframes are subframes with non-zero $n_{DL\_ACK}$ values in Table 3.

TABLE 3

$n_{DL\_ACK}$ for Uplink HARQ Timeline

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

For TDD, each downlink subframe of each uplink-downlink configuration is also associated with a specific HARQ timeline for data transmission on the downlink, which may be referred to as a downlink HARQ timeline. The downlink HARQ timeline for each downlink subframe indicates a specific uplink subframe in which to send ACK/NACK on the PUCCH or PUSCH for data transmission sent on the PDSCH in that downlink subframe. As shown in FIG. 3A, ACK/NACK may be sent on the PUCCH or PUSCH in an uplink subframe that is $n_{UL\_ACK}$ subframes later than a downlink subframe in which data is transmitted on the PDSCH, where $n_{UL\_ACK} \geq 4$ in LTE Release 10.

Table 4 lists the values of $n_{UL\_ACK}$ for different uplink subframes in which ACK/NACK may be sent on the PUCCH or PUSCH for the seven uplink-downlink configurations shown in Table 1. As an example, for uplink-downlink configuration 0, ACK/NACK may be sent on the PUCCH or PUSCH (i) in uplink subframe 2 for data transmission sent on the PDSCH in downlink subframe 6 of the previous radio frame or (ii) in uplink subframe 4 for data transmission sent on the PDSCH in downlink subframe 0.

TABLE 4

$n_{UL\_ACK}$ for Downlink HARQ Timeline

| Uplink-Downlink Configuration | Uplink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | | | 6 | | 4 | | | 6 | | 4 |
| 1 | | | 6, 7 | 4 | | | | 6, 7 | 4 | |
| 2 | | | 4, 6, 7, 8 | | | | | 4, 6, 7, 8 | | |
| 3 | | | 6, 7, 11 | 5, 6 | 4, 5 | | | | | |
| 4 | | | 7, 8, 11, 12 | 4, 5, 6, 7 | | | | | | |
| 5 | | | 4, 5, 6, 7, 8, 9, 11, 12, 13 | | | | | | | |
| 6 | | | 7 | 7 | 5 | | | 7 | 7 | |

FIG. 4A shows downlink data transmission on a TDD CC with uplink-downlink configuration 1. For uplink-downlink configuration 1, each radio frame includes downlink subframes 0, 1, 4, 5, 6 and 9 (denoted as "D" and "S") and uplink subframes 2, 3, 7 and 8 (denoted as "U"). For data transmission on the downlink, an eNB may send downlink (DL) grants and data in downlink subframes 0, 1, 4, 5, 6 and 9, and a UE may send ACK/NACK in uplink subframes 7, 7, 8, 2, 2 and 3, respectively.

FIG. 4B shows uplink data transmission on the TDD CC with uplink-downlink configuration 1. An eNB may send uplink (UL) grants in downlink subframes 1, 4, 6 and 9, a UE may send data in uplink subframes 7, 8, 2 and 3, respectively, and the eNB may send ACK/NACK in downlink subframes 1, 4, 6 and 9, respectively.

FIG. 5A shows downlink data transmission on a TDD CC with uplink-downlink configuration 2. For uplink-downlink configuration 2, each radio frame includes downlink subframes 0, 1, 3, 4, 5, 6, 8 and 9 and uplink subframes 2 and 7. For data transmission on the downlink, an eNB may send DL grants and data in downlink subframes 0, 1, 3, 4, 5, 6, 8 and 9, and a UE may send ACK/NACK in uplink subframes 7, 7, 7, 2, 2, 2, 2 and 7, respectively.

FIG. 5B shows uplink data transmission on the TDD CC with uplink-downlink configuration 2. An eNB may send UL grants in downlink subframes 3 and 8, a UE may send data in uplink subframes 7 and 2, respectively, and the eNB may send ACK/NACK in downlink subframes 3 and 8, respectively.

Wireless network 100 may support operation on a single carrier or multiple CCs for each of the downlink and uplink. Operation on multiple CCs may be referred to as carrier aggregation (CA), multi-carrier operation, etc.

Figure 6A:
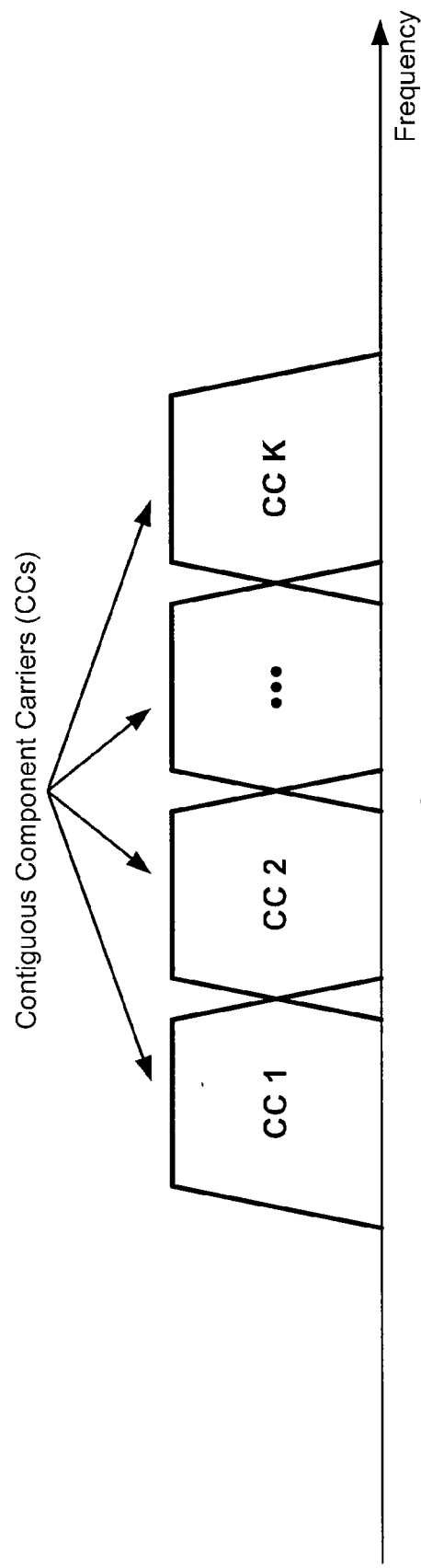
FIGS. 6A and 6B show continuous and non-continuous carrier aggregation.

FIG. 6A shows an example of continuous carrier aggregation. K CCs may be available and may be adjacent to each other, where in general K may be any integer value. Each CC may have a bandwidth of 20 MHz or less in LTE.

Figure 6B:
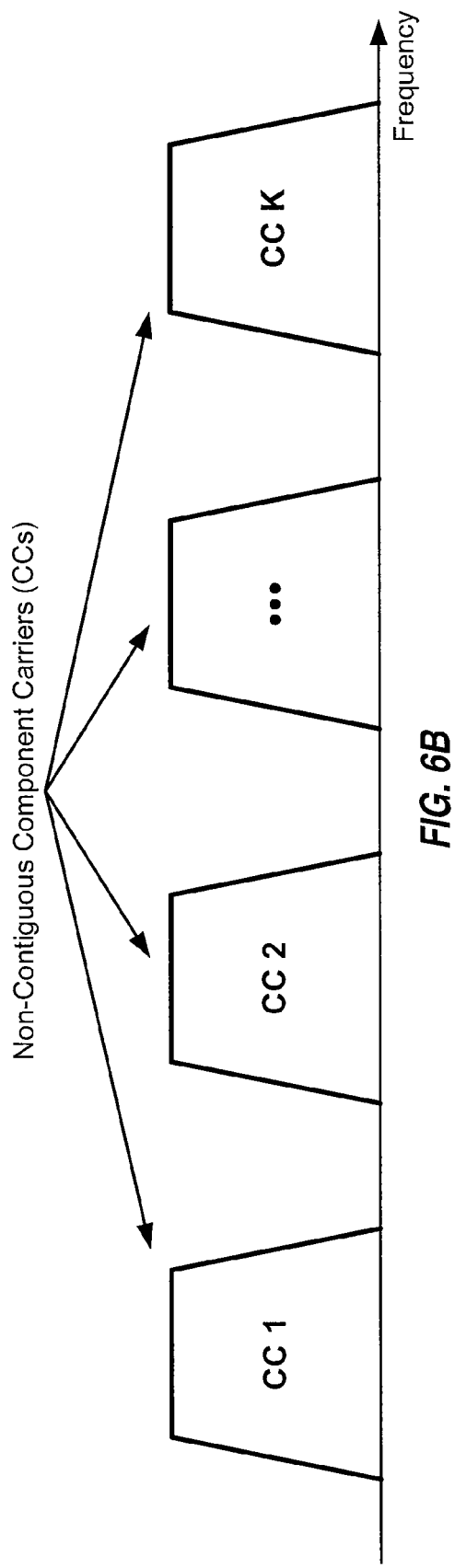

FIG. 6B shows an example of non-continuous carrier aggregation. K CCs may be available and may be separate from each other. Each CC may have a bandwidth of 20 MHz or less in LTE.

In one design, data and control information may be independently sent and received on each CC. This may be achieved by using (i) a separate inverse fast Fourier transform (IFFT) and a separate transmitter for each CC at a transmitting entity and (ii) a separate receiver and a separate fast Fourier transform (FFT) for each CC at a receiving entity. Up to K OFDM symbols or SC-FDMA symbols may be transmitted concurrently on up to K CCs in one symbol period.

In another design, data and control information may be sent and received together on all CCs. This may be achieved by using (i) a single IFFT and a single transmitter for all K CCs at a transmitting entity and (ii) a single receiver and a single FFT for all K CCs at a receiving entity. A single OFDM symbol or SC-FDMA symbol may be transmitted on up to K CCs in one symbol period.

In LTE Release 10, a UE may be configured with up to five CCs for carrier aggregation. Each CC may have a bandwidth of up to 20 MHz and may be backward compatible with LTE Release 8. The UE may thus be configured with up to 100 MHz for up to five CCs. In one design, one CC may be designated as a primary CC (PCC) for the downlink and may be referred to as a downlink PCC. The downlink PCC may carry certain DCI such as downlink grants, uplink grants, ACK/NACK, etc. In one design, one CC may be designated as a primary CC for the uplink and may be referred to as an uplink PCC. The uplink PCC may carry certain UCI such as ACK/NACK, etc. In one design, the downlink PCC may be the same as the uplink PCC, and both may be referred to as a PCC. In another design, the downlink PCC may be different from the uplink PCC.

For carrier aggregation, a UE may support operation on one PCC and one or more secondary CCs (SCCs) on the downlink. The UE may also support operation on one PCC and zero or more SCCs on the uplink. An SCC is a CC that is not a PCC.

A UE may be configured with multiple CCs for carrier aggregation. These multiple CCs may be associated with different system configurations and may include (i) a combination of TDD and FDD CCs and/or (ii) CCs with different uplink-downlink configurations. The different uplink-downlink configurations for different CCs may be due to various reasons such as (i) different uplink-downlink configurations for TDD, e.g., as shown in Table 1, (ii) partitioning of downlink subframes and uplink subframes to support operation of relays, (iii) allocation of downlink subframes and uplink subframes to support home eNBs, pico eNBs, etc., and/or (iv) other reasons. Different uplink-downlink configurations may be associated with different subframes available for downlink and uplink. The multiple CCs may thus be associated with (i) different downlink subframes available for sending data and DCI on the downlink and (ii) different uplink subframes available for sending data and UCI on the uplink. Supporting multiple CCs with different system configurations may provide more flexibility in deployment but may complicate operation on the multiple CCs.

For clarity, the following terminology is used in the description herein:
PCC—a CC designated to carry control information on the downlink and/or uplink,
SCC—a CC that is not a PCC,
PCC configuration—an uplink-downlink configuration for the PCC,
SCC configuration—an uplink-downlink configuration for an SCC,
PCC timeline—an HARQ timeline for the PCC, and
SCC timeline—an HARQ timeline for the SCC.

As an example, a UE may be configured with 3 CCs, CC1, CC2 and CC3, with each CC including a DL CC and an UL CC. UCI for CC1, CC2 and CC3 may be transmitted on UL CC1 if UCI is transmitted using PUCCH. As a result, UL CC1 may be referred to as an UL PCC whereas UL CC2 and UL CC3 may be referred to as UL SCCs. DL CC1 may be designated as a DL PCC, and DL CC2 may be designated as a DL SCC. In this case, DCI for CC2 may be transmitted on DL CC1. Alternatively, DCI for CC2 may be transmitted on DL CC3, in which case DL CC3 may schedule downlink and/or uplink data transmission for CC2 and may be referred to as a DL PCC for DL CC2.

Control information may be sent in various manners to support operation on multiple CCs with different uplink-downlink configurations in a TDD deployment. In one design, cross-carrier control may be supported for multiple CCs. For cross-carrier control, control information may be sent on one CC to support data transmission on another CC.

In one design, control information may be sent for each CC based on an HARQ timeline for that CC. In this design, data transmission on a PCC may be supported based on an HARQ timeline for the PCC, which may be dependent on the uplink-downlink configuration for the PCC. Data transmission on the PCC may occur in the same manner as for the case of a single CC.

Data transmission on an SCC may be supported by sending DCI on the downlink PCC and UCI on the uplink PCC based on an HARQ timeline for the SCC, which may be dependent on an uplink-downlink configuration for the SCC. However, if the uplink-downlink configuration for the SCC is different from the uplink-downlink configuration for the PCC, then it may not be possible to schedule data transmission on the SCC in some subframes due to lack of subframes on the PCC to send control information. This may be due to various reasons. First, a scheduling CC used to send grants may be uplink heavy and may include more uplink subframes than downlink subframes. In this case, it may not be possible to schedule data transmission on an SCC in some downlink subframes and/or uplink subframes due to the lack of downlink subframes on the scheduling CC to send grants. Second, the PCC may be downlink heavy and may include more downlink subframes than uplink subframes. In this case, it may not be possible to schedule data transmission on an SCC in some downlink subframes due to lack of uplink subframes on the PCC to send ACK/NACK. Third, it may be difficult to send ACK/NACK on the PHICH due to lack of downlink subframes on the PCC.

Figure 7A:
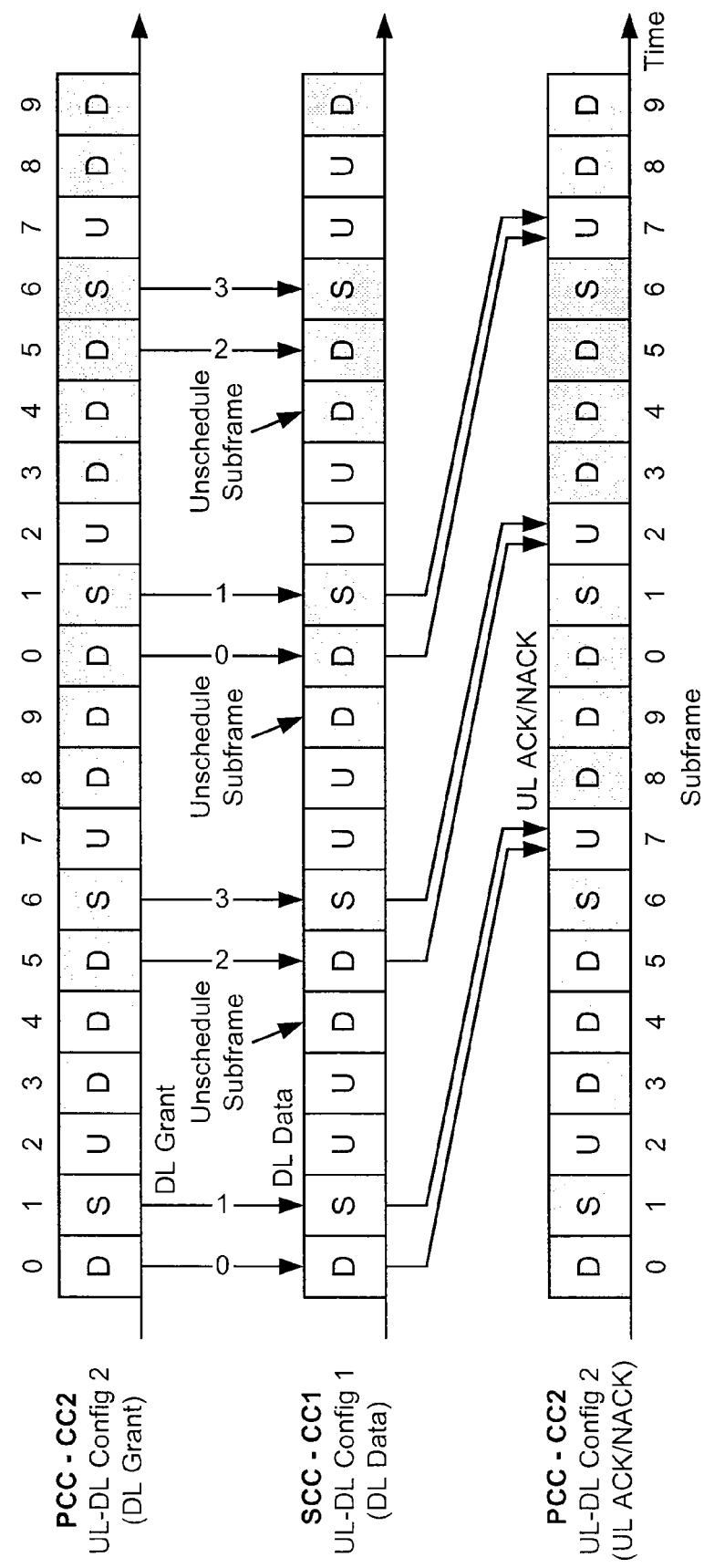
FIGS. 7A and 7B show downlink and uplink data transmission on an SCC with control information sent on a PCC based on an HARQ timeline for the SCC.
Figure 7B:
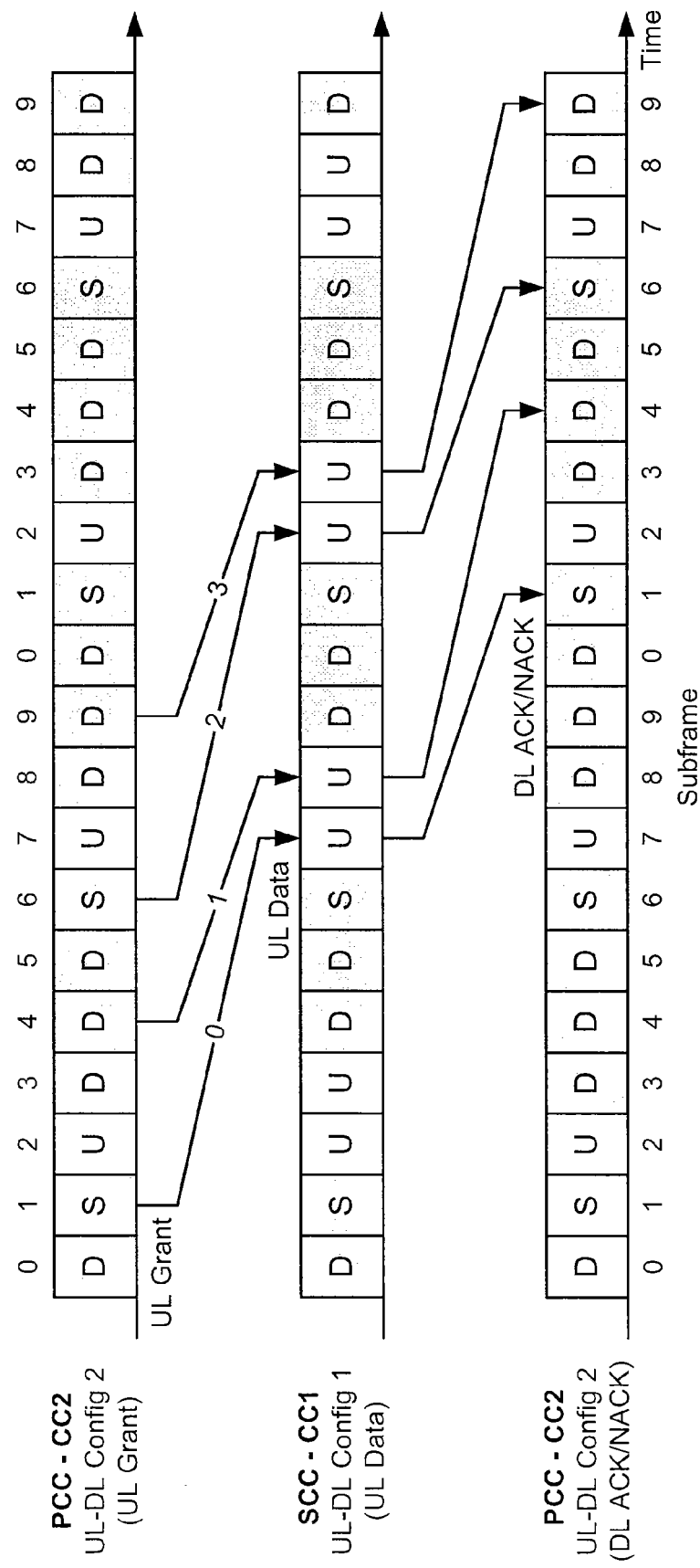

FIGS. 7A and 7B show an example of supporting data transmission on an SCC by sending control information on the PCC based on an HARQ timeline for the SCC. In this example, a UE is configured with two CCs, CC1 and CC2, CC1 is an SCC having uplink-downlink configuration 1, and CC2 is a PCC having uplink-downlink configuration 2. Downlink subframes and uplink subframes for the PCC are determined by uplink-downlink configuration 2 and are labeled in FIGS. 7A and 7B. Downlink subframes and uplink subframes for the SCC are determined by uplink-downlink configuration 1 and are also labeled in FIGS. 7A and 7B.

Data transmission on the PCC may be supported based on an HARQ timeline for uplink-downlink configuration 2 of the PCC. Data transmission on the SCC may be supported based on an HARQ timeline for uplink-downlink configuration 1 of the SCC, as described below.

FIG. 7A shows downlink data transmission on the SCC with control information sent on the PCC based on the HARQ timeline for the SCC. For the SCC, six subframes 0, 1, 4, 5, 6 and 9 are downlink subframes, and four subframes 2, 3, 7 and 8 are uplink subframes for uplink-downlink configuration 1. Downlink data transmission on the SCC in downlink subframes 0, 1, 5 and 6 may be achieved by (i) sending downlink grants on the PCC in downlink subframes 0, 1, 5 and 6, respectively, and (ii) sending ACK/NACK on the PCC in uplink subframes 7, 7, 2 and 2, respectively. In FIG. 7A, a line with a single arrow from a downlink subframe on the PCC to a downlink subframe on the SCC indicates a downlink grant sent on the PCC for downlink data transmission on the SCC. The number in the center of the line indicates an HARQ process number. A line with a single arrow from a downlink subframe on the SCC to an uplink subframe on the PCC indicates ACK/NACK feedback for downlink data transmission on the SCC.

Downlink data transmission on the SCC in downlink subframes 4 and 9 may not be supported due to a lack of uplink subframes to send ACK/NACK. In particular, for data transmission in downlink subframe 4, ACK/NACK should be sent on the PCC in uplink subframe 8 based on uplink-downlink configuration 1 for the SCC. However, subframe 8 is a downlink subframe on the PCC due to uplink-downlink configuration 2 for the PCC, and ACK/NACK cannot be sent on the uplink on the PCC in downlink subframe 8.

FIG. 7B shows uplink data transmission on the SCC with control information sent on the PCC based on the HARQ timeline for the SCC. Uplink data transmission on the SCC in uplink subframes 2, 3, 7 and 8 may be achieved by (i) sending uplink grants on the PCC in downlink subframes 6, 9, 1 and 4, respectively, and (ii) sending ACK/NACK on the PCC in downlink subframes 6, 9, 1 and 4, respectively.

In general, aggregation of multiple CCs with different uplink-downlink configurations may result in some subframes being unschedulable based on an HARQ timeline for an SCC. Certain uplink-downlink configurations may be especially problematic. For example, uplink-downlink configurations that are very asymmetric in terms of the number of downlink subframes and uplink subframes (e.g., uplink-downlink configurations 1 and 5) may have more unschedulable subframes. Uplink-downlink configurations in which some subframes are downlink subframes on one CC and are uplink subframes on another CC (e.g., uplink-downlink configurations 1 and 3, uplink-downlink configurations 2 and 3, and uplink-downlink configurations 2 and 4) may also be problematic. Data transmission on the SCC based on the HARQ timeline of the uplink-downlink configuration for the SCC may adversely impact peak data rate due to the unschedulable subframes.

Various schemes may be used to support data transmission on multiple CCs with different uplink-downlink configurations. These schemes may include one or more of the following schemes:

Scheme 1—Send DCI and/or UCI for SCC on PCC based on HARQ timeline for PCC,

Scheme 2—Use cross-subframe scheduling,

Scheme 3—Use UE-specific downlink PCC and uplink PCC, and

Scheme 4—Send UCI on multiple CCs.

The four schemes listed above are described in further detail below.

In the first scheme, control information for an SCC may be sent on a PCC based on an HARQ timeline for the PCC. The first scheme may be applicable to only DCI, or only UCI, or both DCI and UCI. Control information for the SCC may thus be sent based on the HARQ timeline for the PCC on which the control information is sent, and not based a HARQ timeline for the SCC for which the control information is intended. A UE may be configured with multiple CCs. The UE may support an HARQ timeline for the PCC and may use the same HARQ timeline for the SCC.

In the first scheme, scheduling for data transmission on an SCC may follow the HARQ timeline for the SCC. Scheduling for data transmission on the SCC via cross-carrier scheduling (with control information sent on the PCC and data sent on the SCC) and same-carrier scheduling (with both control information and data sent on the SCC) may be time aligned. For downlink data transmission, downlink grants may be sent on the PDCCH and ACK/NACK may be sent on the PUCCH based on the HARQ timeline for the uplink-downlink configuration for the PCC. For uplink data transmission, uplink grants may be sent on the PDCCH and ACK/NACK may be sent on the PHICH based on the HARQ timeline for the uplink-downlink configuration for the PCC. DCI for the SCC may be a subset of DCI for the PCC and may be readily sent on the PCC. Alternatively, the HARQ timeline for the PCC may not be defined for all uplink subframes on the SCC. In this case, scheduling for these uplink subframes may be based on the HARQ timeline for the SCC or a new HARQ timeline.

Figure 8A:
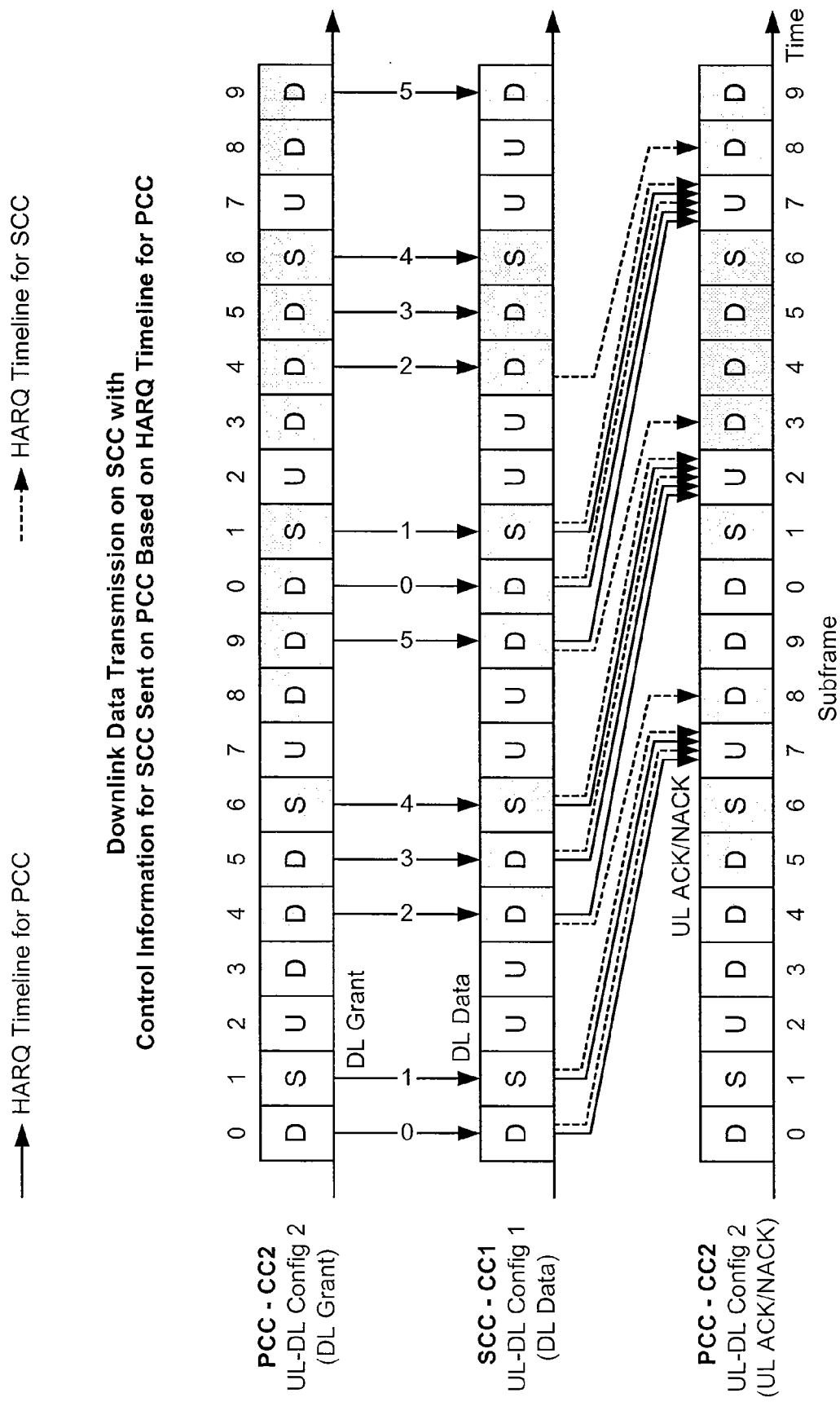
FIGS. 8A to 8D show downlink and uplink data transmission on an SCC with control information sent on a PCC based on an HARQ timeline for the PCC.
Figure 8B:
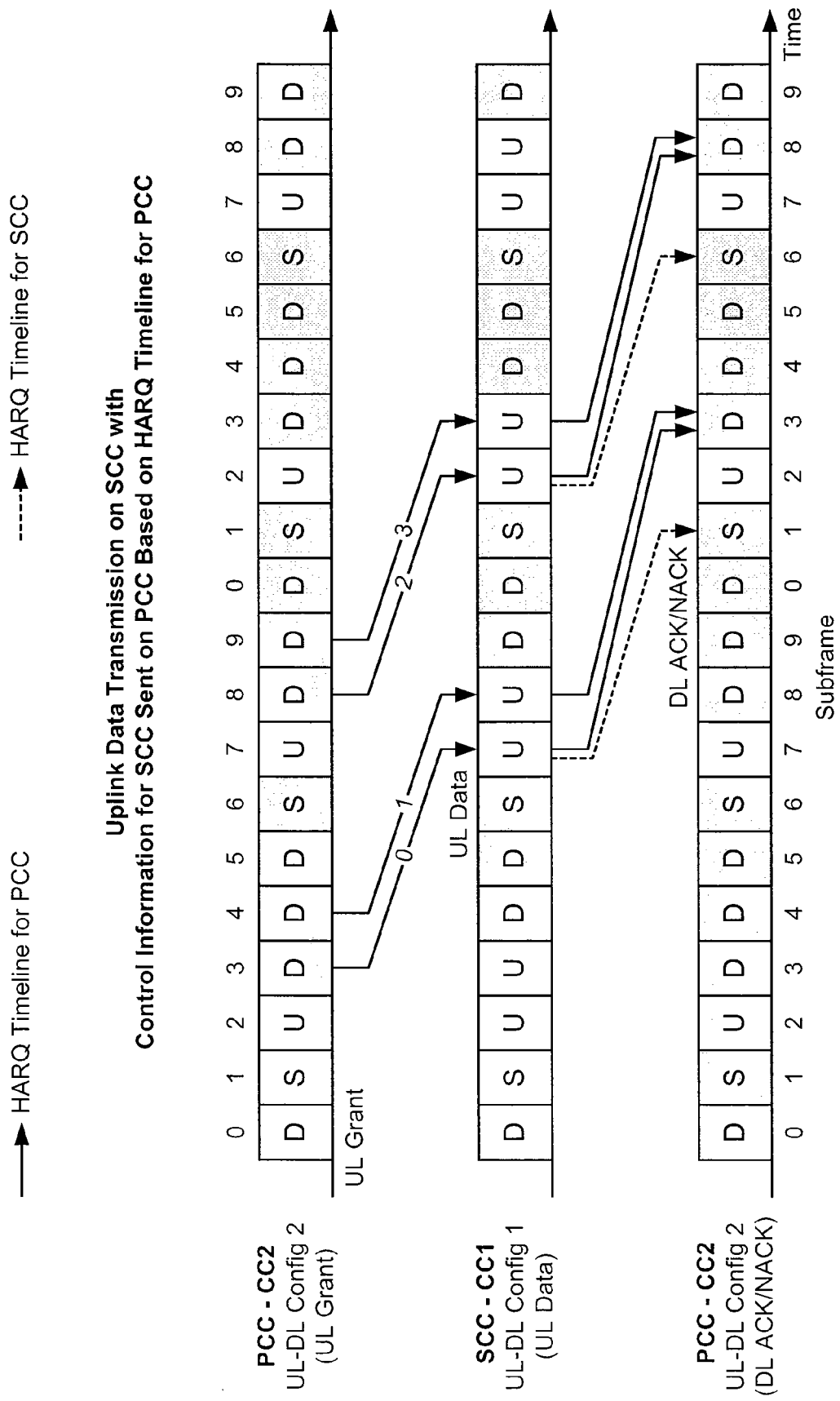

FIGS. 8A and 8B show an example of supporting data transmission on multiple CCs based on the first scheme. In this example, a UE is configured with two CCs, CC1 and CC2, CC1 is an SCC having uplink-downlink configuration 1, and CC2 is a PCC having uplink-downlink configuration 2. Downlink subframes and uplink subframes for each CC are labeled in FIGS. 8A and 8B. For the PCC, eight subframes 0, 1, 3, 4, 5, 6, 8 and 9 are downlink subframes, and four subframes 2 and 7 are uplink subframes for uplink-downlink configuration 2. For the SCC, six subframes 0, 1, 4, 5, 6 and 9 are downlink subframes, and four subframes 2, 3, 7 and 8 are uplink subframes for uplink-downlink configuration 1.

FIG. 8A shows downlink data transmission on the SCC with control information sent on the PCC based on the HARQ timeline for the PCC. For downlink data transmission on the SCC, downlink grants may be sent on the PCC in downlink subframes 0, 1, 4, 5, 6 and 9 for data transmission on the SCC in downlink subframes 0, 1, 4, 5, 6 and 9, respectively. ACK/NACK for data transmission on the SCC in downlink subframes 0, 1, 4, 5, 6 and 9 may be sent on the PCC in uplink subframe 7, 7, 2, 2, 2 and 7, respectively, which may be determined based on uplink-downlink configuration 2 for the PCC.

As shown in FIG. 8A, the first scheme may be especially applicable for downlink data transmission when the PCC is downlink heavier than the SCC. In this case, there are more downlink subframes on the PCC than the SCC to send DCI for a smaller number of available downlink subframes on the SCC. Downlink subframes on the SCC may be a subset of the downlink subframes on the PCC.

FIG. 8B shows uplink data transmission on the SCC with control information sent on the PCC based on the HARQ timeline for the PCC. For uplink data transmission on the SCC, uplink grants may be sent on the PCC in downlink subframes 3, 4, 8 and 9 for data transmission on the SCC in uplink subframes 7, 8, 2 and 3, respectively. ACK/NACK for data transmission on the SCC in uplink subframes 7, 8, 2 and 3 may be sent on the PCC in downlink subframes 3, 3, 8 and 8, respectively, which may be determined based on uplink-downlink configuration 2 for the PCC.

In one design that is shown in FIG. 8B, ACK/NACK for uplink data transmission on the SCC may be sent on the PHICH on the PCC only in non-zero PHICH subframes for the PCC, which may be determined based on the uplink-downlink configuration for the PCC. As shown in Table 3, only subframes 3 and 8 are non-zero PHICH subframes for the PCC based on uplink-downlink configuration 2 for the PCC. In this case, ACK/NACK for uplink data transmission in subframes 7, 8, 2 and 3 may be sent on the PCC in downlink subframes 3, 3, 8 and 8, respectively, as shown in FIG. 8B. ACK/NACK is not sent based on the HARQ timeline of the SCC because non-zero PHICH subframes for the SCC may correspond to zero-PHICH subframes for the PCC.

Figure 8C:
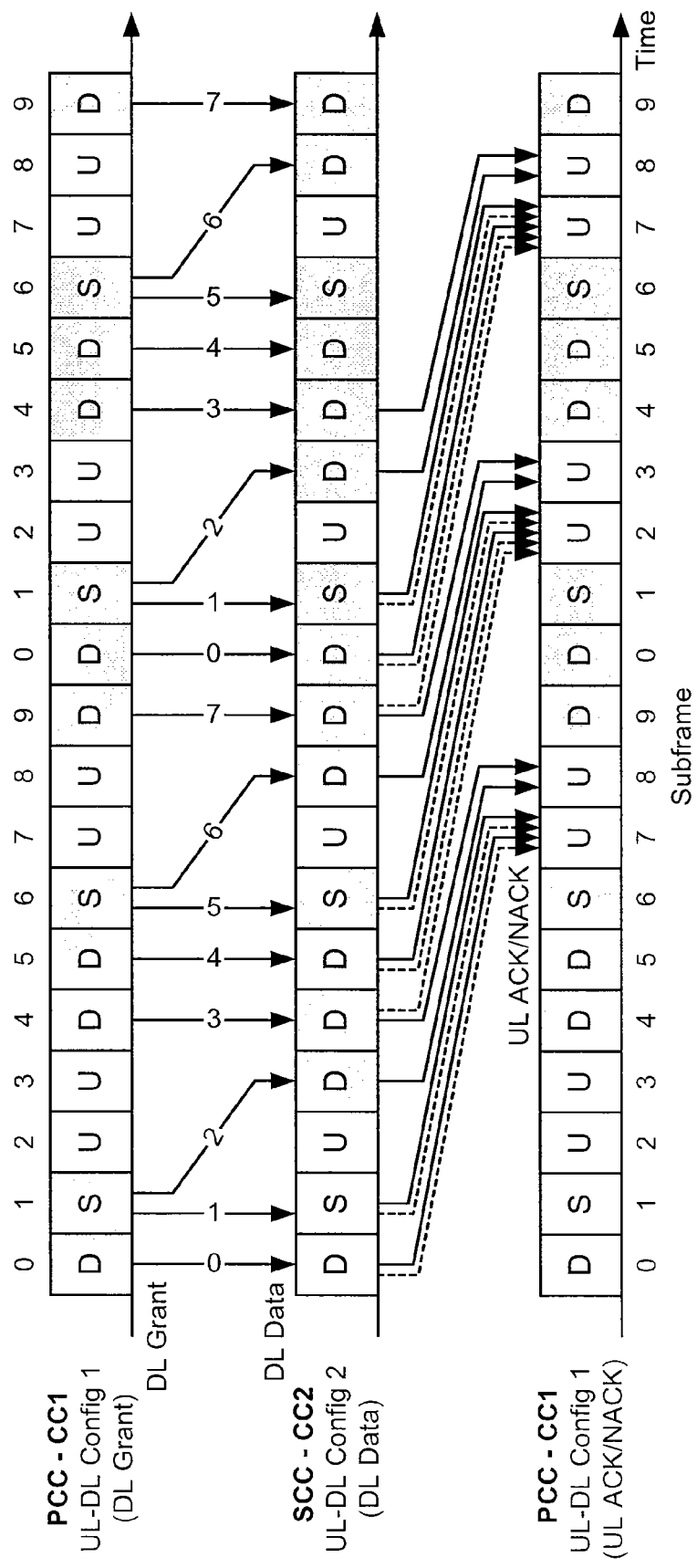
Figure 8D:
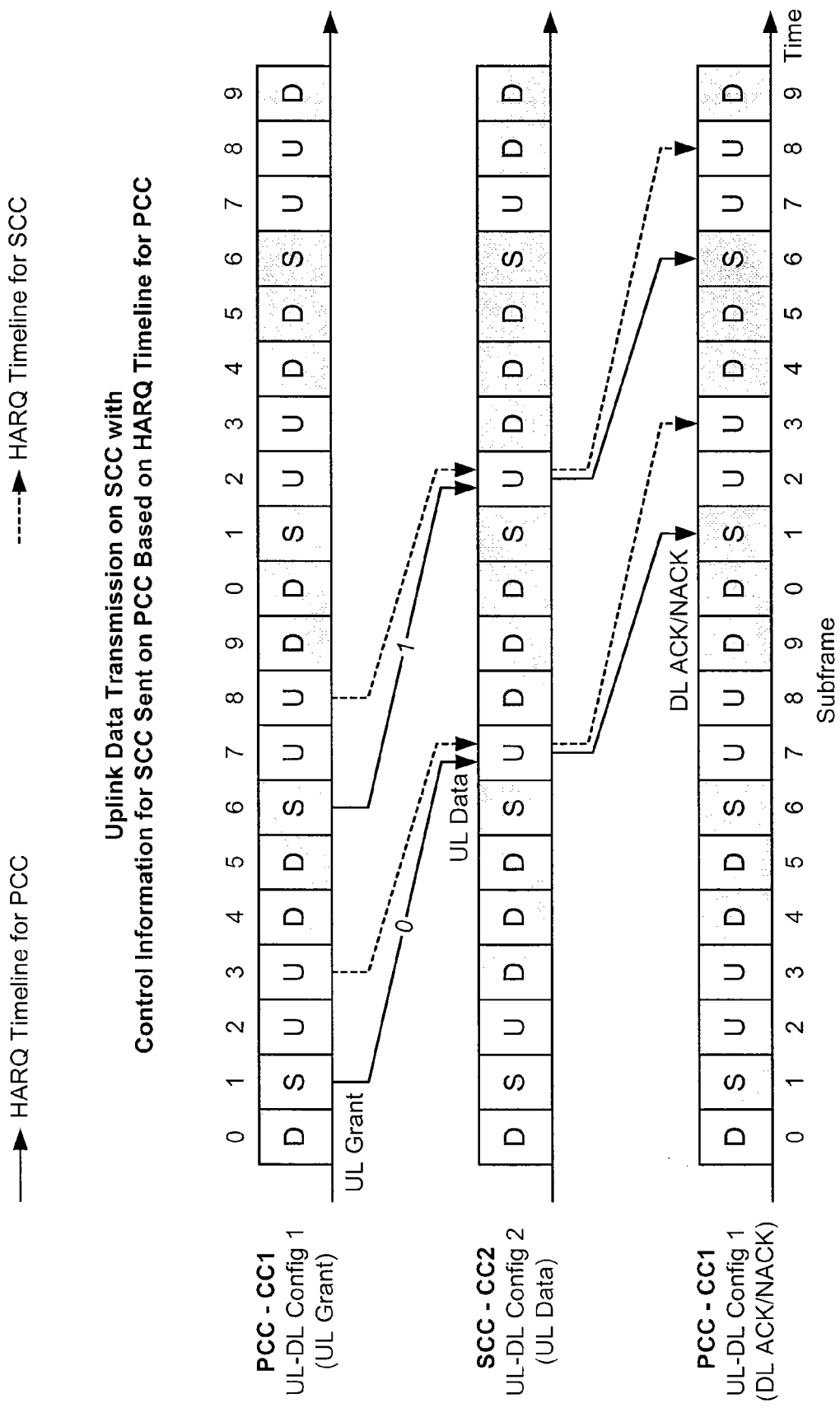

FIGS. 8C and 8D show another example of supporting data transmission on multiple CCs based on the first scheme. In this example, a UE is configured with two CCs, CC1 and CC2, CC1 is a PCC having uplink-downlink configuration 1, and CC2 is an SCC having uplink-downlink configuration 2.

FIG. 8C shows downlink data transmission on the SCC with control information sent on the PCC based on the HARQ timeline for the PCC. For data transmission on the downlink, an eNB may send downlink grants in downlink subframes 0, 1, 1, 4, 5, 6, 6 and 9 and data in downlink subframes 0, 1, 3, 4, 5, 6, 8 and 9, respectively, and a UE may send ACK/NACK in uplink subframes 7, 7, 8, 8, 2, 2, 3 and 3, respectively, based on uplink-downlink configuration 1 for the PCC. Cross-subframe scheduling may be used to send multiple downlink grants in the same downlink subframe (e.g., subframe 1) to schedule multiple downlink subframes (e.g., subframes 1 and 3).

FIG. 8D shows uplink data transmission on the SCC with control information sent on the PCC based on the HARQ timeline for the PCC. In this example, an eNB may send uplink grants in downlink subframes 1 and 6, a UE may send data in uplink subframes 7 and 2, respectively, and the eNB may send ACK/NACK in downlink subframes 1 and 6, respectively, based on uplink-downlink configuration 1 for the PCC.

As shown in FIG. 8D, the first scheme may be especially applicable for data transmission on the uplink when the PCC is uplink heavier than the SCC. In this case, UCI (e.g., ACK/NACK) for fewer uplink subframes on the SCC may be sent in downlink subframes on the PCC based on the HARQ timeline for the PCC (instead of being mapped to uplink subframes of the PCC based on the HARQ timeline for the SCC, as shown by the dashed lines in FIG. 8D).

In the first scheme, for data transmission on the downlink, downlink grants may be sent on the PCC based on the HARQ timeline of the PCC to schedule data transmission on the SCC. ACK/NACK may be sent on the PUCCH or PUSCH on the PCC based on the HARQ timeline of the PCC. For data transmission on the uplink, uplink grants may be sent on the PCC based on the HARQ timeline of the PCC (or the HARQ timeline of the SCC) to schedule data transmission on the SCC. ACK/NACK may be sent on the PHICH on the PCC based on the HARQ timeline of the PCC. Scheduling of the SCC by cross-carrier scheduling and same-carrier scheduling may be time aligned.

In the first scheme, downlink subframes on the SCC may be a subset of the downlink subframes on the PCC, e.g., as shown in FIGS. 8A and 8B. In this case, all downlink subframes of the SCC may be scheduled in downlink subframes of the PCC, e.g., as shown in FIG. 8A. Uplink subframes on the PCC may be a subset of the uplink subframes on the SCC, e.g., as shown in FIGS. 8A and 8B. Uplink subframes on the SCC that correspond to downlink subframes of the PCC (e.g., uplink subframes 3 and 8 in FIG. 8B) may be scheduled based on the HARQ timeline of the SCC or a new HARQ timeline.

A UE may send CSI feedback on the PUCCH on the PCC, which may be downlink heavier than the SCC. The CSI feedback may include channel quality indicator (CQI), precoding matrix indicator (PMI), rank indicator (RI), etc. The UE may have a CSI configuration that may indicate a periodicity at which to report CSI and specific subframes in which to report CSI. The CSI configuration of the UE may be determined based on the uplink-downlink configuration for the PCC. For periodic CSI reporting, certain periodicity values may be available for each uplink-downlink configuration. For example, reporting period of 1 ms may be applicable for uplink-downlink configurations 0, 1, 3, 4 and 6, where all uplink subframes in a radio frame may be used for CSI reporting. Reporting period of 5 ms may be applicable for uplink-downlink configurations 0, 1, 2 and 6. Reporting periods of 10, 20, 40, 80 and 160 ms may be applicable for all uplink-downlink configurations. For example, if the PCC is associated with uplink-downlink configuration 2 and the SCC is associated with uplink-downlink configuration 1, then the CSI configuration of the UE cannot support CSI reporting periodicity of 1 ms if CSI is sent on the PCC instead of the SCC.

Downlink data transmission may be sent on the SCC, and ACK/NACK may be sent on the PCC, e.g., as shown in FIG. 8A. In one design, ACK/NACK mapping rules defined in LTE Release 10 may be reused. ACK/NACK may be sent in various manners in LTE. If PUCCH format 1b with channel selection is used to send ACK/NACK, then an ACK/NACK mapping table may be selected for the largest value of M across all CCs configured for a UE, where M is the number of downlink subframes associated with a single uplink subframe. M may be different for different uplink-downlink configurations for different CCs. The largest value of M may be for the PCC, which may be downlink heaviest among all CCs configured for the UE. In one design, ACK may be assumed for virtual subframes of CCs with smaller M. A virtual subframe is a subframe of a CC that is not a downlink subframe but is counted as a downlink subframe from ACK/NACK mapping table perspective. If PUCCH format 3 is used to send ACK/NACK, then ACK/NACK for only applicable CCs and subframes may be multiplexed In the second scheme, cross-subframe scheduling may be used to support data transmission on multiple CCs with different uplink-downlink configurations. For cross-subframe scheduling, a grant may be sent in a different subframe than the subframe specified by an HARQ timeline without cross-subframe scheduling. Multiple grants may be sent in the same downlink subframe to schedule data transmission in multiple subframes. Cross-subframe scheduling may be especially applicable when a scheduling CC (i.e., a CC used to send grants) is uplink heavy. In the description herein, uplink scheduling refers to transmission of an uplink grant to schedule data transmission on the uplink. Downlink scheduling refers to transmission of a downlink grant to schedule data transmission on the downlink.

In the second scheme, UCI for an SCC may be sent on the PCC and may follow the HARQ timeline of the SCC. DCI (e.g., uplink grants and ACK/NACK) may be sent on the PCC based on the HARQ timeline of the PCC. This may be due to the lack of downlink subframes on the PCC to follow the HARQ timeline for the SCC.

Figure 9A:
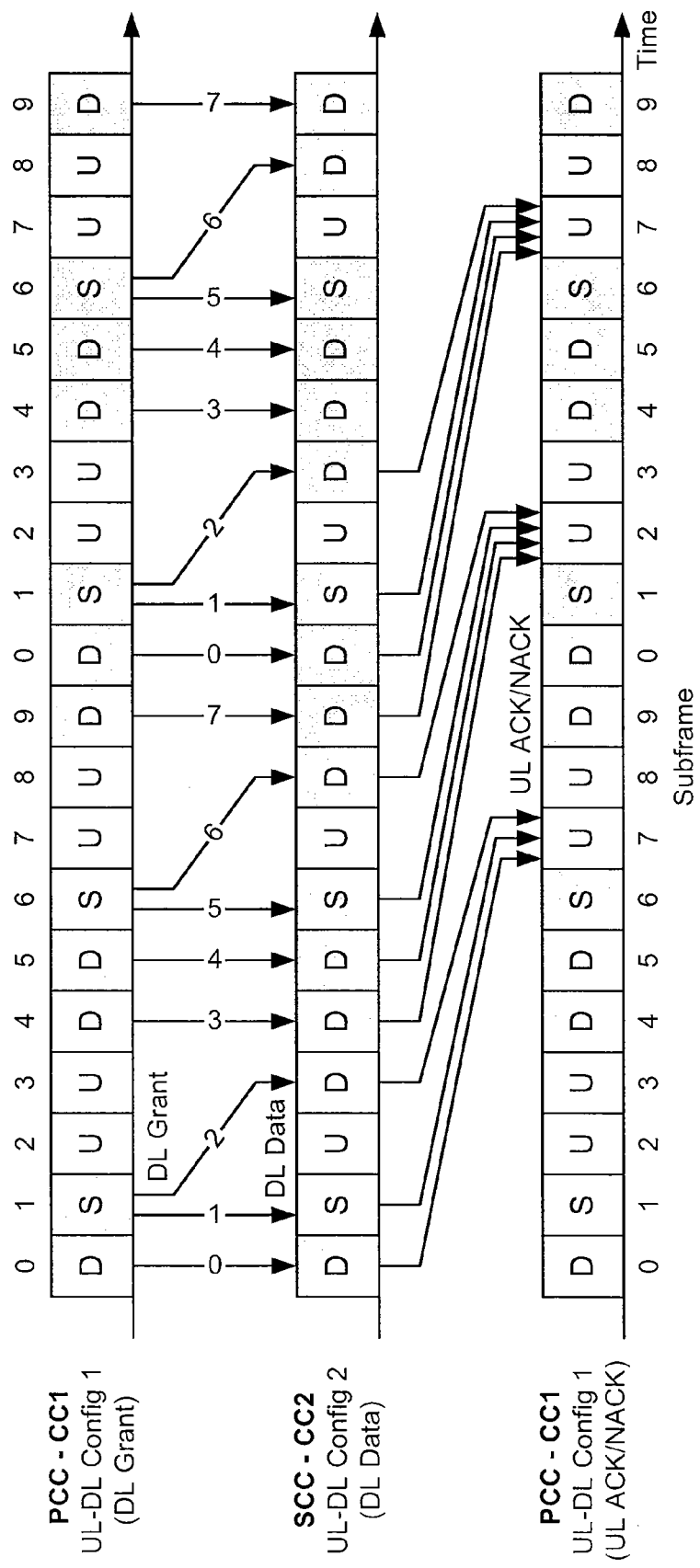
FIGS. 9A and 9B show downlink and uplink data transmission on an SCC with cross-subframe scheduling.
Figure 9B:
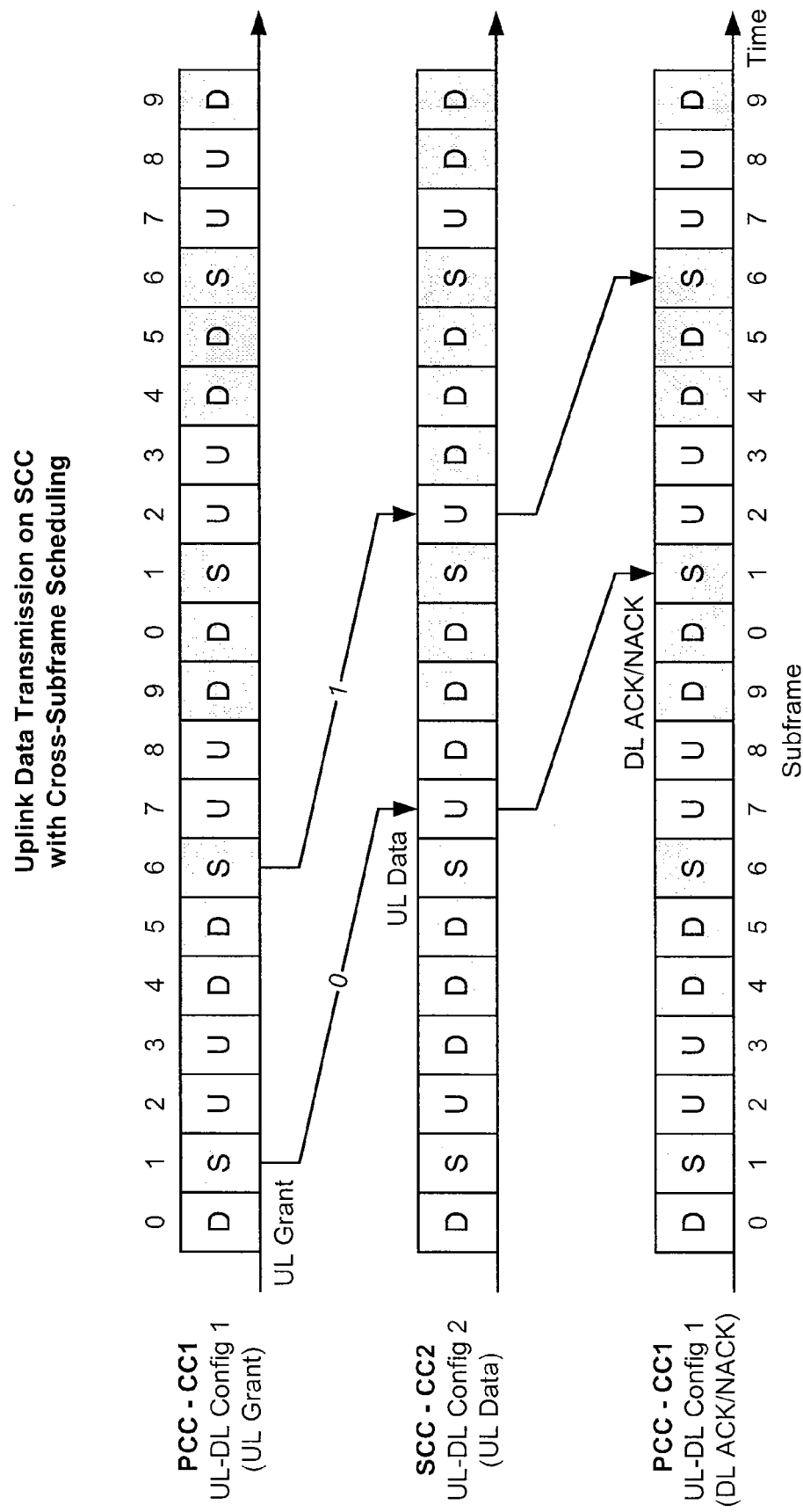

FIGS. 9A and 9B show an example of supporting data transmission on multiple CCs based on the second scheme. In this example, a UE is configured with two CCs, CC1 and CC2, CC1 is a PCC having uplink-downlink configuration 1, and CC2 is an SCC having uplink-downlink configuration 2. For the PCC, six subframes 0, 1, 4, 5, 6 and 9 are downlink subframes, and four subframes 2, 3, 7 and 8 are uplink subframes for uplink-downlink configuration 1. For the SCC, eight subframes 0, 1, 3, 4, 5, 6, 8 and 9 are downlink subframes, and two subframes 2 and 7 are uplink subframes for uplink-downlink configuration 2.

FIG. 9A shows downlink data transmission on the SCC with cross-subframe scheduling. For downlink data transmission on the SCC, downlink grants may be sent on the PCC in downlink subframes 0, 1, 1, 4, 5, 6 and 9 for data transmission on the SCC in downlink subframes 0, 1, 3, 4, 5, 6, 8 and 9, respectively. Multiple downlink grants may be sent on the PCC in downlink subframe 1 for data transmission on the SCC in downlink subframes 1 and 3 with cross-subframe scheduling. ACK/NACK for data transmission on the SCC in downlink subframes 0, 1 and 3 may be sent on the PCC in uplink subframe 7. ACK/NACK for data transmission on the SCC in downlink subframes 4, 5, 6 and 8 may be sent on the PCC in uplink subframe 2 of the next radio frame. ACK/NACK for data transmission on the SCC in downlink subframe 9 may be sent on the PCC in uplink subframe 7 of the next radio frame.

FIG. 9B shows uplink data transmission on the SCC with cross-subframe scheduling. For uplink data transmission on the SCC, uplink grants may be sent on the PCC in downlink subframes 1 and 6 for data transmission on the SCC in uplink subframes 7 and 2, respectively. ACK/NACK for data transmission on the SCC in uplink subframes 7 and 2 may be sent on the PCC in downlink subframes 1 and 6, respectively.

In the second scheme, downlink scheduling for subframes on the SCC that correspond to downlink subframes on the PCC may follow the HARQ timeline of the PCC or the SCC, e.g., as shown in FIG. 9A. Cross-subframe scheduling may be used for subframes that are downlink subframes for the SCC but uplink subframes for the PCC. Cross-subframe scheduling may be achieved by dynamically sending grants on the PDCCH, possibly based on a static or semi-static configuration for cross-subframe scheduling. For example, a UE may be configured such that a grant for data transmission in a particular subframe can be sent in a designated subframe and/or on a designated CC.

In one design, a downlink grant may be sent in a downlink subframe or a special subframe n to schedule data transmission in a downlink subframe on another CC that can allow sufficient time (e.g., at least 3 ms) until the next scheduling opportunity in the same subframe of the next radio frame. For example, a downlink grant may be sent in subframe n to schedule data transmission in subframe n, n+1, n+2, n+3, n+4, n+5, or n+6.

Table 5 lists all possible downlink subframes that may be used for cross-subframe scheduling. In Table 5, the downlink subframes for each uplink-downlink configuration are represented by gray shading. Each numeric entry indicates an offset between a downlink subframe carrying a downlink grant and a downlink subframe scheduled for data transmission. As shown in Table 5, each downlink subframe (or special subframe) includes an entry of 0. This 0 entry means that a downlink grant may be sent in a downlink subframe to scheduled data transmission in the same downlink subframe. A downlink subframe that may be used for cross-subframe scheduling includes one or more non-zero entries. Each non-zero entry indicates an offset of another downlink subframe that can be scheduled with cross-subframe scheduling. For example, downlink subframe 1 for uplink-downlink configuration 3 includes four entries of 0, 1, 2 and 3, which means that a downlink grant may be sent in downlink subframe 1 to scheduled data transmission in subframe 1, 2, 3 or 4 on another CC.

TABLE 5

Cross-Subframe Scheduling for Downlink

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 0,2,3 | 0,1,2,3 | | | | 0,2,3 | 0,1,2,3 | | | |
| 1 | 0,2 | 0,1 | | | 0 | 0,2 | 0,1,2 | | | 0 |
| 2 | 0,2 | 0,1 | | 0 | 0 | 0 | 0,1 | | 0 | 0 |
| 3 | 0,2,3 | 0,1,2,3 | | | | 0 | 0 | 0 | 0,0 | 0,0 |
| 4 | 0,2 | 0,1,2 | | | 0 | 0 | 0 | 0 | 0,0 | 0,0 |
| 5 | 0,2 | 0,1 | | 0 | 0 | 0 | 0 | 0 | 0 | 0,0 |
| 6 | 0,2,3 | 0,1,2,3 | | | | 0,2 | 0,1,2 | | | 0 |

Table 5 may provide the most scheduling flexibility by allowing a downlink grant to be sent in any one of a set of downlink subframes to schedule data transmission in a given downlink subframe. However, operation may be simplified by restricting the number of downlink subframes that can be used for cross-subframe scheduling for each downlink subframe.

Table 6 lists downlink subframes that may be used for cross-subframe scheduling for an example in which the scheduling CC has uplink-downlink configuration 1. The scheduling CC thus has six downlink subframes 0, 1, 4, 5, 6 and 9 and four uplink subframes 2, 3, 7 and 8. In Table 6, the downlink subframes for each uplink-downlink configuration for an SCC are represented by gray shading. Each numeric entry in Table 6 indicates an offset between a downlink subframe on the scheduling CC and a downlink subframe on an SCC for a particular uplink-downlink configuration. For example, subframe 6 for uplink-downlink configuration 3 includes three values of 0, 1 and 2. This means that a downlink grant may be sent on the scheduling CC in downlink subframe 6 to schedule data transmission in downlink subframe 6, 7 or 8 on an SCC with uplink-downlink configuration 3.

TABLE 6

Cross-Subframe Scheduling with Scheduling CC
Having Uplink-Downlink Configuration 1

| Uplink-Downlink Configuration | Downlink Subframe Number n | | | | | | | | | |
|---|---|---|---|---|---|---|---|---|---|---|
| | 0 | 1 | 2 | 3 | 4 | 5 | 6 | 7 | 8 | 9 |
| 1 | 0 | 0 | | | 0 | 0 | 0 | | | 0 |
| 2 | 0 | 0, 2 | | | 0 | 0 | 0, 2 | | | 0 |
| 3 | 0 | 0 | | | | 0 | 0, 1, 2 | | | 0 |
| 4 | 0 | 0 | | | 0 | 0 | 0, 1, 2 | | | 0 |
| 5 | 0 | 0, 2 | | | 0 | 0 | 0, 1, 2 | | | 0 |

In one design, a static or semi-static configuration may restrict the number of downlink subframes (e.g., to only one downlink subframe) that can be used to send a downlink grant to schedule a given downlink subframe. Restriction to a subset of all possible options may simplify operation. For example, a subframe may be scheduled by a grant sent in a specific subframe on a specific CC. This restriction may be defined for each pair of uplink-downlink configurations, which may be with respect to the uplink-downlink configuration of the scheduling CC, e.g., as shown in Table 6.

In one design, a UE may be configured with non-overlapping UE-specific search spaces for same-subframe scheduling and cross-subframe scheduling. The UE may be configured with a first UE-specific search space in which grants may be sent without cross-subframe scheduling, e.g., for data transmission on the PCC. The UE may be configured with a second UE-specific search space in which grants may be sent with cross-subframe scheduling, e.g., for data transmission on an SCC. In another design, a single UE-specific search space may be used for both same-subframe scheduling and cross-subframe scheduling. For both designs, the UE may search in its search space(s) to detect for grants sent to the UE.

In the third scheme, a downlink PCC and an uplink PCC may be independently selected for a UE. For example, the downlink PCC may be downlink heavy (e.g., downlink heaviest among all CCs configured for the UE), and the uplink PCC may be uplink heavy (e.g., uplink heaviest among all CCs configured for the UE). In this case, DCI may be sent on the downlink PCC in a sufficient number of downlink subframes, and UCI may be sent on the uplink PCC in a sufficient number of uplink subframes. In one design, different CCs may be selected as the uplink PCC for different UEs. In another design, a common uplink PCC (e.g., a CC that is uplink heavy or uplink heaviest) may be used for all UEs in a cell.

In the third scheme, scheduling for data transmission on an SCC (i.e., a CC that is not the downlink PCC) may follow the HARQ timeline for the SCC. Scheduling for data transmission on the SCC by cross-carrier scheduling and same-carrier scheduling may be time aligned. The HARQ timeline of the downlink PCC may not be defined for all uplink subframes on the SCC. In one design, for downlink data transmission, ACK/NACK may be sent on the PUCCH based on the HARQ timeline for the uplink-downlink configuration for the uplink PCC. In one design, for uplink data transmission, ACK/NACK may be sent in a PHICH subframe determined based on the uplink-downlink configuration for the downlink PCC.

Figure 10A:
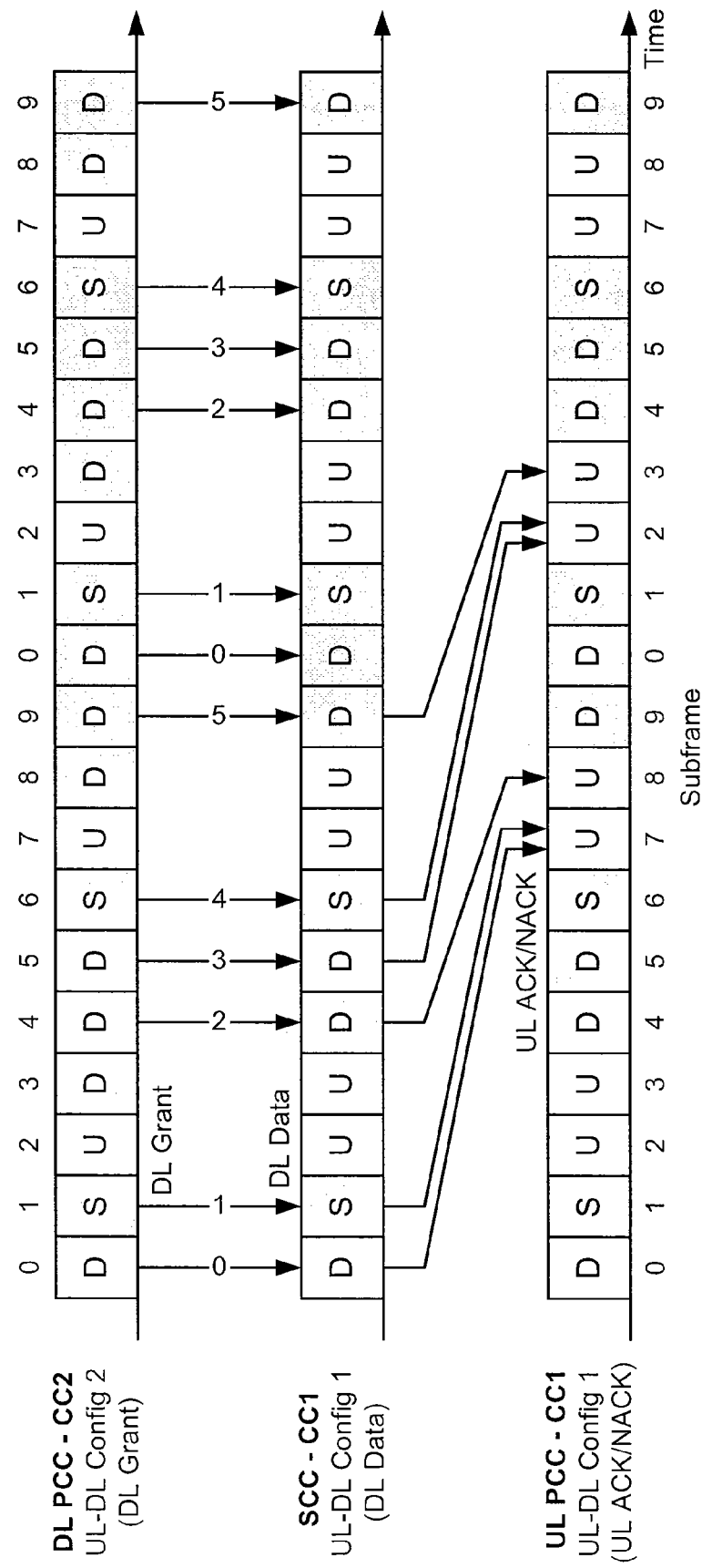
FIGS. 10A and 10B show downlink and uplink data transmission on an SCC with separate downlink PCC and uplink PCC.
Figure 10B:
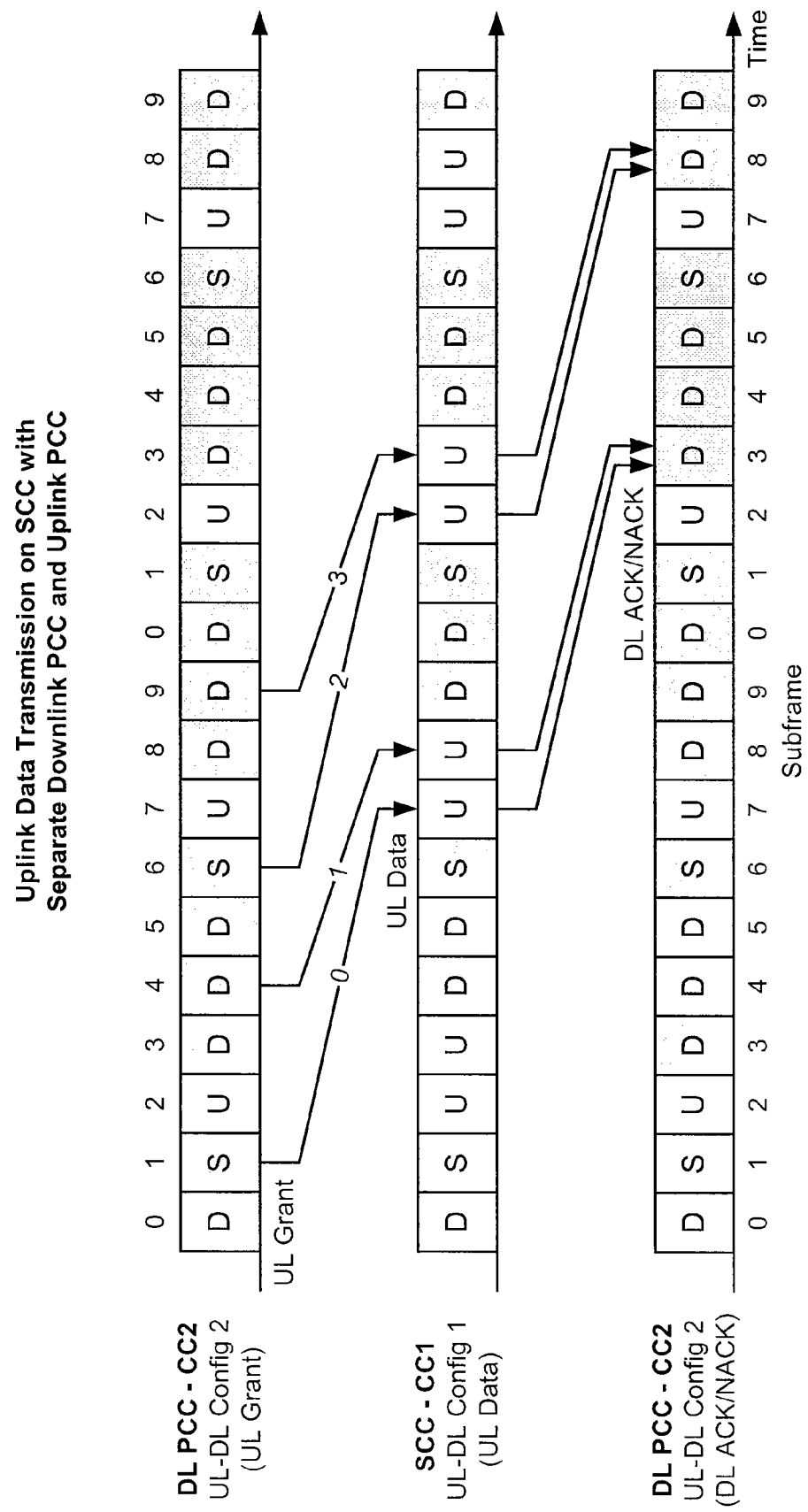

FIGS. 10A and 10B show an example of supporting data transmission on multiple CCs based on the third scheme. In this example, a UE is configured with two CCs, CC1 and CC2, CC1 is an uplink PCC having uplink-downlink configuration 1, and CC2 is a downlink PCC having uplink-downlink configuration 2. CC1 may also be considered as an SCC. For the downlink PCC, eight subframes 0, 1, 3, 4, 5, 6, 8 and 9 are downlink subframes, and two subframes 2 and 7 are uplink subframes for uplink-downlink configuration 2. For the uplink PCC/SCC, six subframes 0, 1, 4, 5 and 9 are downlink subframes, and four subframes 2, 3, 7 and 8 are uplink subframes for uplink-downlink configuration 1.

FIG. 10A shows downlink data transmission on the SCC with separate downlink PCC and uplink PCC. For downlink data transmission on the SCC (or uplink PCC), downlink grants may be sent on the downlink PCC in downlink subframes 0, 1, 4, 5, 6 and 9 for data transmission on the SCC in downlink subframes 0, 1, 4, 5, 6 and 9, respectively. ACK/NACK for data transmission on the SCC in downlink subframes 0, 1, 4, 5, 6 and 9 may be sent on the SCC (or uplink PCC) in uplink subframe 7, 7, 8, 2, 2 and 3, respectively, which may be determined based on the HARQ timeline for uplink-downlink configuration 1 for the SCC.

FIG. 10B shows uplink data transmission on the SCC with separate downlink PCC and uplink PCC. For uplink data transmission on the SCC, uplink grants may be sent on the downlink PCC in downlink subframes 1, 4, 6 and 9 for data transmission on the SCC in uplink subframes 7, 8, 2 and 3, respectively. ACK/NACK for data transmission on the SCC in uplink subframes 7, 8, 2 and 3 may be sent on the downlink PCC in downlink subframes 3, 3, 8 and 8, respectively, which may be determined based on the HARQ timeline for uplink-downlink configuration 2 for the downlink PCC.

In the third scheme, for uplink data transmission, ACK/NACK may be sent in a PHICH subframe determined based on the uplink-downlink configuration of the downlink PCC (instead of based on the uplink-downlink configuration of the SCC). For example, uplink data transmission may be scheduled for uplink subframe 8 on the SCC, as shown in FIG. 10B. ACK/NACK for data transmission in uplink subframe 8 may be sent on the PHICH in downlink subframe 4 based on uplink-downlink configuration 1 for the SCC. However, downlink subframe 3 (and not downlink subframe 4) is a PHICH subframe on the downlink PCC based on uplink-downlink configuration 2 for the downlink PCC. In this case, ACK/NACK may be sent on the PHICH in downlink subframe 3 (instead of downlink subframe 4) for data transmission in uplink subframe 8. Hence, ACK/NACK may be sent in a PHICH subframe (but may not follow the HARQ timeline) for the uplink-downlink configuration for the downlink PCC.

In the fourth scheme, a UE may send UCI on the PUCCH on multiple CCs in various manners. In one design, UCI may be sent on multiple PUCCHs on multiple CCs in the same subframe. UCI for data transmission on a given CC may be sent on that CC. For example, UCI for data transmission on the PCC may be sent on the PCC, and UCI for data transmission on the SCC may be sent on the SCC. In another design, UCI may be sent on one PUCCH on one CC in one subframe and may be sent on multiple CCs in different subframes. For example, UCI may be sent on the PCC whenever possible and may be sent on the SCC in subframes that are uplink subframes for the SCC but downlink subframes for the PCC.

In the fourth scheme, scheduling for uplink data transmission on an SCC may follow the HARQ timeline for the SCC. Scheduling for data transmission on the SCC by cross-carrier scheduling and same-carrier scheduling may be time aligned. The HARQ timeline of the PCC may not be defined for all uplink subframes on the SCC. For uplink data transmission, ACK/NACK may be sent on the PHICH based on the HARQ timeline for the uplink-downlink configuration for the PCC.

In general, a PCC may be downlink heavy or uplink heavy. If the PCC is downlink heavy, then scheduling for data transmission on the downlink and uplink may not be impacted. ACK/NACK may be sent on the PHICH in PHICH subframes determined based on the uplink-downlink configuration for the PCC. Transmission of UCI on the uplink may be impacted. The second, third, or fourth scheme may be used to facilitate transmission of UCI on the uplink. Conversely, if the PCC is uplink heavy, then scheduling for data transmission on the downlink may be impacted, which may be resolved by using cross-subframe scheduling in the second scheme. Scheduling for data transmission on the uplink and ACK/NACK feedback on the PHICH may follow the HARQ timeline for the PCC. This may be preferred due to the lack of downlink subframes and PHICH subframes based on the HARQ timeline for the SCC. UCI on the uplink may not be impacted.

In the first through fourth schemes described above, cross-carrier scheduling may be used to support data transmission on multiple CCs. In an alternative design, cross-carrier scheduling is not utilized to support data transmission on multiple CCs. In this alternative design, operation among multiple CCs may be coupled due to transmission of a common PUCCH on the uplink for all CCs. If the PCC is not uplink heavy (e.g., due to load balancing, or different CCs being chosen as PCCs for different UEs), then the first or fourth scheme may be used. For the first scheme, UCI for an SCC may be sent on the PCC based on the HARQ timeline of the PCC. For the fourth scheme, UCI for a UE may be sent on the PUCCH on more than one CC.

FIG. 11 shows a design of a process 1100 for supporting operation on multiple CCs. Process 1100 may be performed by an eNB/base station (as described below) or by some other entity. The eNB may identify a first CC and a second CC configured for a UE for carrier aggregation, with the first and second CCs being associated with different system configurations (block 1112). The first CC may be a PCC and the second CC may be an SCC for the UE. The eNB may send a downlink grant on the first CC to schedule the UE for data transmission on the second CC (block 1114). The downlink grant may be for the second CC and may be sent based on a downlink grant transmission timeline for the first CC. The eNB may send the data transmission on the second CC to the UE (block 1116). The eNB may receive UCI for the data transmission on the second CC (block 1118). The UCI may be for the second CC and may be sent on the first CC by the UE based on a UCI transmission timeline for the first CC. The downlink grant transmission timeline and the UCI transmission timeline may be part of an HARQ timeline for the first CC.

In one design, the first and second CCs may be associated with different duplexing mode, e.g., FDD and TDD. In another design, the first and second CCs may be associated with different uplink-downlink configurations, e.g., for TDD. For example, the first CC may be associated with a first uplink-downlink configuration, and the second CC may be associated with a second uplink-downlink configuration. The UCI transmission timeline for the first CC may be determined based on the first uplink-downlink configuration for the first CC. In one design, the first CC may be associated with more downlink subframes than the second CC.

In one design, the UCI may comprise ACK/NACK for the data transmission sent on the second CC to the UE. In one design, the ACK/NACK may be sent by the UE based on PUCCH format 1b with channel selection. A mapping table for the ACK/NACK may be determined based on the largest number of downlink subframes associated with a single uplink subframe for all CCs configured for the UE. In another design, the ACK/NACK may be sent based on PUCCH format 3 or some other PUCCH format. The ACK/NACK may also be sent with data on the PUSCH.

In another design, the UCI may comprise CSI sent by the UE based on a CSI configuration for the UE. The eNB may periodically receive CSI for the second CC from the UE. The CSI may be sent by the UE at a periodicity determined based on the first uplink-downlink configuration for the first CC.

In one design, the eNB may send an uplink grant to schedule the UE for uplink data transmission on the first CC or the second CC. The uplink grant may be sent on the first CC based on an uplink grant transmission timeline for the first CC.

In another design, the eNB may send an uplink grant to schedule the UE for uplink data transmission on the second CC. The uplink grant for the second CC may be sent on (i) the first CC based on an uplink grant transmission timeline for the second CC, or (ii) the first CC based on an uplink grant transmission timeline for the first CC, or (iii) a third CC based on an uplink grant transmission timeline for the third CC. The eNB may receive uplink data transmission on the second CC from the UE. The eNB may determine ACK/NACK for the uplink data transmission on the second CC. The eNB may send the ACK/NACK on the first CC in a subframe determined based on a downlink ACK/NACK transmission timeline for the first CC.

FIG. 12 shows a design of a process 1200 for operating on multiple CCs. Process 1200 may be performed by a UE (as described below) or by some other entity. The UE may determine a first CC and a second CC configured for the UE, with the first and second CCs being associated with different system configurations, e.g., different uplink-downlink configurations (block 1212). The UE may receive a downlink grant sent on the first CC to schedule the UE for data transmission on the second CC (block 1214). The downlink grant may be for the second CC and may be sent based on a downlink grant transmission timeline for the first CC. The UE may receive a data transmission on the second CC (block 1216). The UE may send UCI for the data transmission on the second CC (block 1218). The UCI may be for the second CC and may be sent on the first CC based on a UCI transmission timeline for the first CC. The UCI may comprise ACK/NACK for the data transmission sent on the second CC to the UE. The UCI may also comprise CSI, which may be used to send the data transmission on the second CC.

In one design, the UE may receive an uplink grant scheduling the UE for uplink data transmission on the first CC or the second CC. The uplink grant may be sent on the first CC based on an uplink grant transmission timeline for the first CC. In another design, the UE may receive an uplink grant scheduling the UE for uplink data transmission on the second CC. The uplink grant may be sent on (i) the first CC based on an uplink grant transmission timeline for the second CC or (ii) a third CC based on an uplink grant transmission timeline for the third CC. The UE may send uplink data transmission on the second CC. The UE may thereafter receive ACK/NACK for the uplink data transmission on the second CC. The ACK/NACK may be sent on the first CC in a subframe determined based on a downlink ACK/NACK transmission timeline for the first CC.

FIG. 13 shows a design of a process 1300 for supporting operation on multiple CCs. Process 1300 may be performed by an eNB/base station (as described below) or by some other entity. The eNB may identify a first CC and a second CC configured for a UE for carrier aggregation, with the first and second CCs being associated with different system configurations, e.g., different uplink-downlink configurations (block 1312). The eNB may send an uplink grant on the first CC to schedule the UE for uplink data transmission on the second CC (block 1314). The uplink grant may be for the second CC and may be sent on the first CC based on an uplink grant transmission timeline for the first CC.

The eNB may receive uplink data transmission sent on the second CC by the UE based on the uplink grant (block 1316). The eNB may determine ACK/NACK for the uplink data transmission (block 1318). The eNB may send the ACK/NACK on the first CC in a subframe determined based on an ACK/NACK transmission timeline for the first CC (block 1320). In one design, the determined subframe may be a PHICH subframe for the first CC, which may be a subframe in which ACK/NACK can be sent on the first CC based on an uplink-downlink configuration for the first CC. The uplink grant transmission timeline and the ACK/NACK transmission timeline may be part of an HARQ timeline for the first CC.

In one design, the first CC may be a primary CC for the UE, and the second CC may be a secondary CC for the UE. The first CC may be associated with a first uplink-downlink configuration, and the second CC may be associated with a second uplink-downlink configuration. The uplink grant transmission timeline for the first CC may be determined based on the first uplink-downlink configuration for the first CC. In one design, the first CC may be associated with more uplink subframes than the second CC.

In one design, the eNB may send a second uplink grant on the first CC to schedule the UE for uplink data transmission on the first CC. The second uplink grant may be for the first CC and may be sent based on the uplink grant transmission timeline for the first CC. The eNB may receive uplink data transmission sent on the second CC by the UE based on the second uplink grant.

FIG. 14 shows a design of a process 1400 for operating on multiple CCs. Process 1400 may be performed by a UE (as described below) or by some other entity. The UE may determine a first CC and a second CC configured for the UE, with the first and second CCs being associated with different system configurations, e.g., different uplink-downlink configurations (block 1412). The UE may receive an uplink grant sent on the first CC to schedule the UE for uplink data transmission on the second CC (block 1414). The uplink grant may be for the second CC and may be sent on the first CC based on an uplink grant transmission timeline for the first CC. The UE may send uplink data transmission on the second CC based on the uplink grant (block 1416). The UE may receive ACK/NACK for the uplink data transmission on the first CC in a subframe determined based on an ACK/NACK transmission timeline for the first CC (block 1418).

The UE may also receive a second uplink grant sent on the first CC to schedule the UE for uplink data transmission on the first CC. The second uplink grant may be for the first CC and may be sent based on the uplink grant transmission timeline for the first CC. The UE may send uplink data transmission on the first CC based on the second uplink grant.

FIG. 15 shows a design of a process 1500 for supporting operation on multiple CCs. Process 1500 may be performed by an eNB/base station (as described below) or by some other entity. The eNB may identify a first CC and a second CC configured for a UE for carrier aggregation, with the first and second CCs being associated with different system configurations, e.g., different uplink-downlink configurations (block 1512). For cross-subframe scheduling, the eNB may send a downlink grant on the first CC in a first subframe to schedule downlink data transmission on the second CC in a second subframe different from the first subframe (block 1514). For same-subframe scheduling, the eNB may send a second downlink grant on the first CC in the first subframe to schedule downlink data transmission on the second CC in the first subframe (block 1516).

In one design, for cross-subframe scheduling, each downlink subframe for the second CC may be schedulable via only one downlink subframe for the first CC, e.g., as shown in Table 6. In another design, each downlink subframe for the second CC may be schedulable via one or more downlink subframes for the first CC.

In one design, the eNB may receive UCI for the second CC on the first CC. The UCI for the second CC may be sent on the first CC based on a UCI transmission timeline (e.g., an HARQ timeline) for the second CC.

In one design, the eNB may send an uplink grant on the first CC to schedule the UE for uplink data transmission on the second CC. The uplink grant for uplink data transmission on the second CC may be sent on the first CC based on an uplink grant transmission timeline (e.g., an HARQ timeline) for the first CC. The eNB may receive uplink data transmission on the second CC and may determine ACK/NACK for the uplink data transmission. The eNB may send the ACK/NACK on the first CC in a subframe determined based on an ACK/NACK transmission timeline for the first CC.

FIG. 16 shows a design of a process 1600 for operating on multiple CCs. Process 1600 may be performed by a UE (as described below) or by some other entity. The UE may determine a first CC and a second CC configured for the UE, with the first and second CCs being associated with different system configurations, e.g., different uplink-downlink configurations (block 1612). The first CC may be associated with more uplink subframes than the second CC. For cross-subframe scheduling, the UE may receive a downlink grant sent on the first CC in a first subframe for downlink data transmission on the second CC in a second subframe different from the first subframe (block 1614). For same-subframe scheduling, the UE may receive a second downlink grant sent on the first CC in the first subframe for downlink data transmission on the second CC in the first subframe (block 1616). In one design, the UE may send UCI for the second CC on the first CC based on a UCI transmission timeline for the second CC.

In one design, the UE may receive an uplink grant on the first CC to schedule the UE for uplink data transmission on the second CC. The uplink grant for uplink data transmission on the second CC may be sent on the first CC based on an uplink grant transmission timeline for the first CC. The UE may send uplink data transmission on the second CC. The UE may thereafter receive ACK/NACK for the uplink data transmission. The ACK/NACK may be sent on the first CC in a subframe determined based on an ACK/NACK transmission timeline for the first CC.

Figures 17, 18:
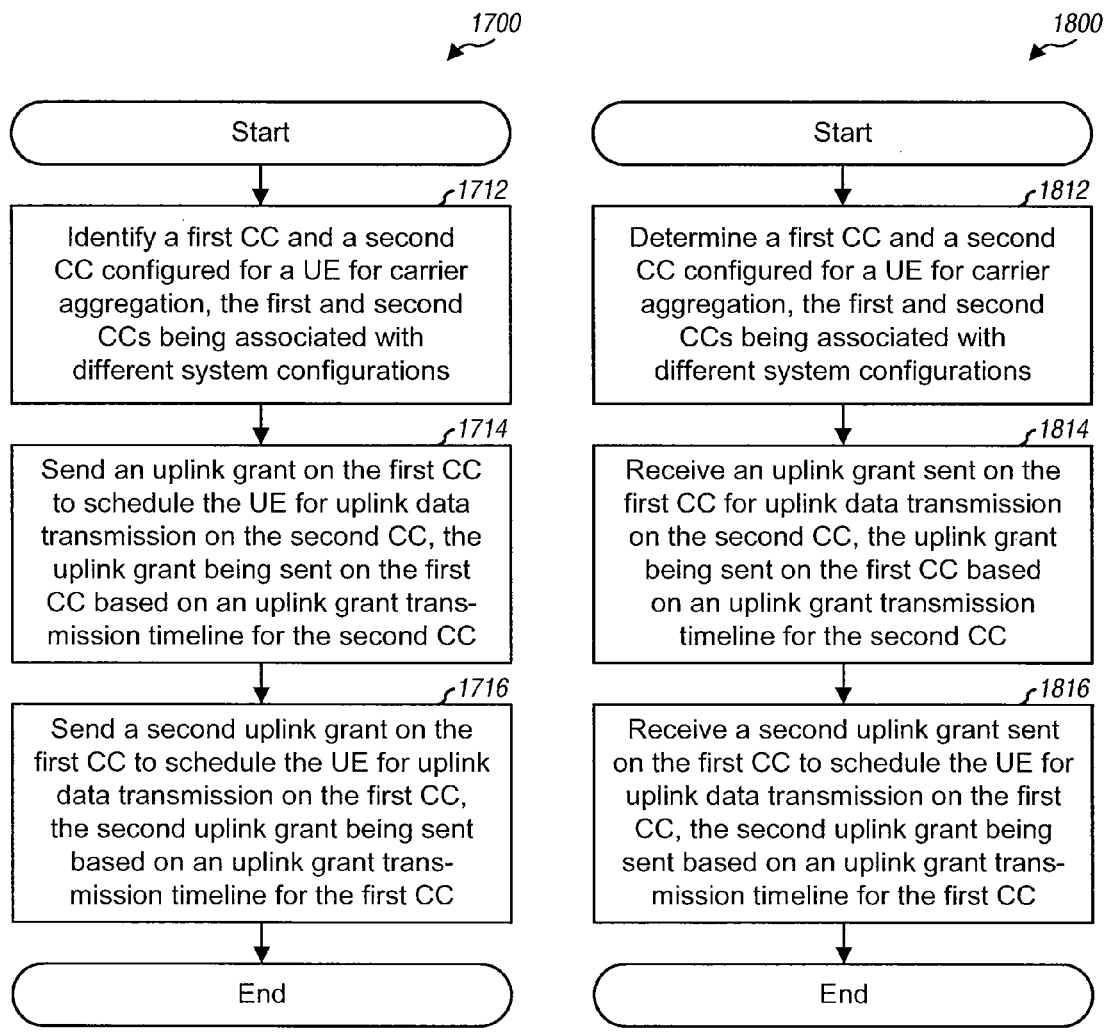

FIG. 17 shows a design of a process 1700 for supporting operation on multiple CCs. Process 1700 may be performed by an eNB/base station (as described below) or by some other entity. The eNB may identify a first CC and a second CC configured for a UE for carrier aggregation, with the first and second CCs being associated with different system configurations, e.g., different uplink-downlink configurations (block 1712). The first CC may be associated with more downlink subframes than the second CC. The second CC may be associated with more uplink subframes than downlink subframes and/or more uplink subframes than the first CC. The eNB may send an uplink grant on the first CC to schedule the UE for uplink data transmission on the second CC (block 1714). The uplink grant may be sent on the first CC based on an uplink grant transmission timeline (e.g., an HARQ timeline) for the second CC. The eNB may send a second uplink grant on the first CC to schedule the UE for uplink data transmission on the first CC (block 1716). The second uplink grant may be sent based on an uplink grant transmission timeline for the first CC.

In one design, the eNB may receive uplink data transmission on the second CC and may determine ACK/NACK for the uplink data transmission. The eNB may send the ACK/NACK on the first CC in a subframe determined based on an ACK/NACK transmission timeline for the first CC.

The eNB may send a downlink grant on the first CC to schedule the UE for downlink data transmission on the second CC. The downlink grant may be sent based on a downlink grant transmission timeline for the second CC (e.g., except for cross-subframe downlink scheduling). The eNB may send downlink data transmission on the second CC and may receive ACK/NACK for the downlink data transmission.

In one design, for the first scheme described above, the first CC may be a PCC and the second CC may be an SCC for a UE. The eNB may receive UCI for data transmission on the second CC, with the UCI being sent on the first CC based on a UCI transmission timeline for the first CC.

In one design, for the third scheme described above, the first CC may be a downlink PCC and the second CC may be an uplink PCC for a UE. The eNB may send DCI on the downlink PCC to the UE and may receive UCI on the uplink PCC from the UE.

For the fourth scheme, the eNB may receive first UCI on the first CC from the UE and may receive second UCI on the second CC from the UE. In one design, the first UCI may be for data transmission on the first CC, and the second UCI may be for data transmission on the second CC. In one design, the first UCI may be sent on the first CC and the second UCI may be sent on the second CC in the same subframe. In another design, the first UCI may be sent on the first CC and the second UCI may be sent on the second CC in different subframes. For example, the second UCI may be sent in a subframe that is an uplink subframe for the second CC but is a downlink subframe for the first CC.

FIG. 18 shows a design of a process 1800 for operating on multiple CCs. Process 1800 may be performed by a UE (as described below) or by some other entity. The UE may determine a first CC and a second CC configured for the UE, with the first and second CCs being associated with different system configurations, e.g., different uplink-downlink configurations (block 1812). The first CC may be associated with more downlink subframes than the second CC. The second CC may be associated with more uplink subframes than downlink subframes and/or more uplink subframes than the first CC. The UE may receive an uplink grant sent on the first CC for uplink data transmission on the second CC (block 1814). The uplink grant may be sent on the first CC based on an uplink grant transmission timeline for the second CC. The UE may receive a second uplink grant sent on the first CC for uplink data transmission on the first CC (block 1816). The second uplink grant may be sent based on an uplink grant transmission timeline for the first CC.

In one design, the UE may send uplink data transmission on the second CC. The UE may receive ACK/NACK for the uplink data transmission on the first CC in a subframe determined based on an ACK/NACK transmission timeline for the first CC.

The UE may receive a downlink grant sent on the first CC to schedule the UE for downlink data transmission on the second CC. The downlink grant may be sent based on a downlink grant transmission timeline for the second CC (e.g., except for cross-subframe downlink scheduling). The UE may receive downlink data transmission on the second CC and may send ACK/NACK for the downlink data transmission.

In one design, for the first scheme described above, the first CC may be a PCC and the second CC may be an SCC for the UE. The UE may send UCI for data transmission on the second CC on the first CC based on a UCI transmission timeline for the first CC.

In one design, for the third scheme described above, the first CC may be a downlink PCC and the second CC may be an uplink PCC for the UE. The UE may receive DCI on the downlink PCC and may send UCI on the uplink PCC.

For the fourth scheme, the UE may send first UCI on the first CC and may send second UCI on the second CC. In one design, the first UCI may be for data transmission on the first CC, and the second UCI may be for data transmission on the second CC. In one design, the first UCI may be sent on the first CC and the second UCI may be sent on the second CC in the same subframe. In another design, the first UCI may be sent on the first CC and the second UCI may be sent on the second CC in different subframes. For example, the second UCI may be sent in a subframe that is an uplink subframe for the second CC but is a downlink subframe for the first CC.

Figures 19, 20:
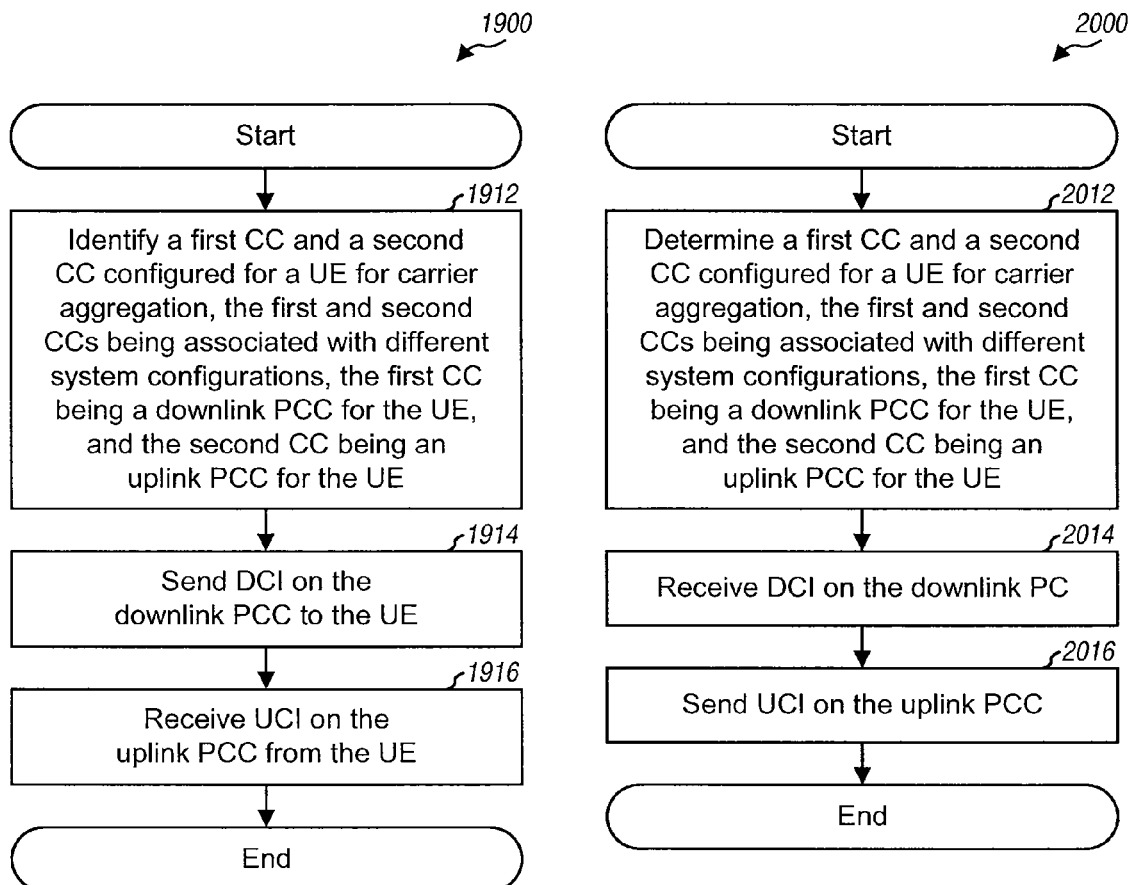

FIG. 19 shows a design of a process 1900 for supporting operation on multiple CCs. Process 1900 may be performed by an eNB/base station (as described below) or by some other entity. The eNB may identify a first CC and a second CC configured for a UE for carrier aggregation, with the first and second CCs being associated with different system configurations, e.g., different uplink-downlink configurations (block 1912). The first CC may be a downlink PCC for the UE, and the second CC may be an uplink PCC for the UE. In one design, the downlink PCC may be associated with more downlink subframes than the uplink PCC, and the uplink PCC may be associated with more uplink subframes than the downlink PCC. The eNB may send DCI on the downlink PCC to the UE (block 1914). The eNB may receive UCI on the uplink PCC from the UE (block 1916).

In one design of block 1914, the eNB may send a first uplink grant on the downlink PCC to schedule the UE for uplink data transmission on the uplink PCC. The first uplink grant may be sent on the downlink PCC based on an uplink grant transmission timeline for the uplink PCC. The eNB may receive uplink data transmission on the uplink PCC. The eNB may determine ACK/NACK for the uplink data transmission and may send the ACK/NACK on the downlink PCC in a subframe determined based on an ACK/NACK transmission timeline for the downlink PCC.

In another design of block 1914, the eNB may send a second uplink grant on the downlink PCC to schedule the UE for uplink data transmission on the downlink PCC. The second uplink grant may be sent based on an uplink grant transmission timeline for the downlink PCC.

FIG. 20 shows a design of a process 2000 for operating on multiple CCs. Process 2000 may be performed by a UE (as described below) or by some other entity. The UE may determine a first CC and a second CC configured for the UE, with the first and second CCs being associated with different system configurations, e.g., different uplink-downlink configurations (block 2012). The first CC may be a downlink PCC for the UE, and the second CC may be an uplink PCC for the UE. The UE may receive DCI on the downlink PCC (block 2014). The UE may send UCI on the uplink PCC (block 2016).

In one design of block 2014, the UE may receive a first uplink grant sent on the downlink PCC to schedule the UE for uplink data transmission on the uplink PCC. The uplink grant may be sent on the downlink PCC based on an uplink grant transmission timeline for the uplink PCC. The UE may send uplink data transmission on the uplink PCC. The UE may receive ACK/NACK for the uplink data transmission on the downlink PCC in a subframe determined based on an ACK/NACK transmission timeline for the downlink PCC.

In another design of block 2014, the UE may receive a second uplink grant sent on the downlink PCC to schedule the UE for uplink data transmission on the downlink PCC. The second uplink grant may be sent based on an uplink grant transmission timeline for the downlink PCC.

Figure 21:
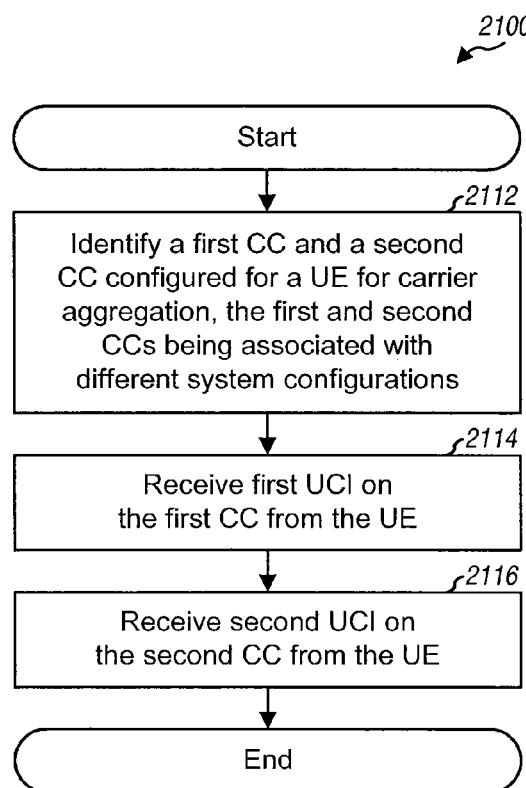

FIG. 21 shows a design of a process 2100 for supporting operation on multiple CCs. Process 2100 may be performed by an eNB/base station (as described below) or by some other entity. The eNB may identify a first CC and a second CC configured for a UE for carrier aggregation, with the first and second CCs being associated with different system configurations, e.g., different uplink-downlink configurations (block 2112). The first CC may be a PCC and the second CC may be an SCC for the UE. The PCC may be associated with more downlink subframes than the SCC. The eNB may receive first UCI on the first CC from the UE (block 2114). The eNB may receive second UCI on the second CC from the UE (block (2116).

In one design, the first UCI may be sent on the first CC and the second UCI may be sent on the second CC in the same subframe. The first UCI sent on the first CC may be applicable for downlink data transmission on the first CC. The second UCI sent on the second CC may be applicable for downlink data transmission on the second CC. In another design, the first UCI may be sent on the first CC in a first subframe, and the second UCI may be sent on the second CC in a second subframe different from the first subframe. The second subframe may be a downlink subframe for the first CC and an uplink subframe for the second CC.

In one design, the eNB may send an uplink grant on the first CC to schedule the UE for uplink data transmission on the second CC. The uplink grant may be sent on the first CC based on an uplink grant transmission timeline for the second CC. The eNB may receive uplink data transmission on the second CC and may determine ACK/NACK for the uplink data transmission. The eNB may send the ACK/NACK for the uplink data transmission on the first CC in a subframe determined based on an ACK/NACK transmission timeline for the first CC.

Figure 22:
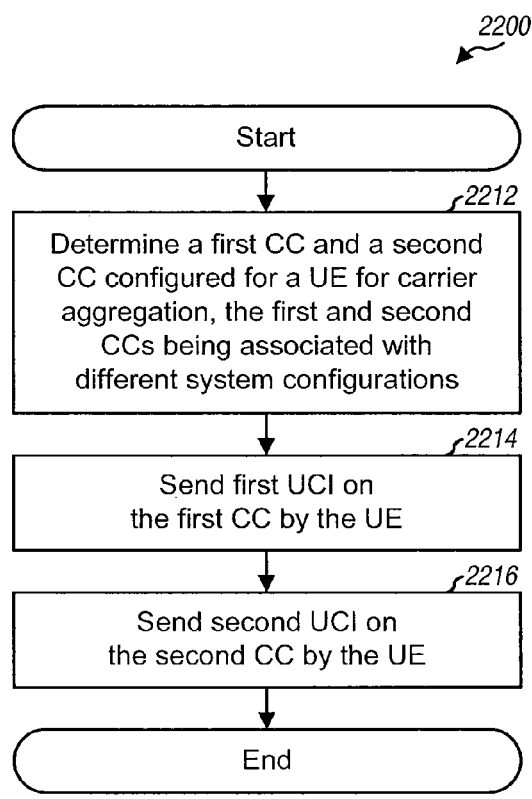

FIG. 22 shows a design of a process 2200 for operating on multiple CCs. Process 2200 may be performed by a UE (as described below) or by some other entity. The UE may determine a first CC and a second CC configured for the UE, with the first and second CCs being associated with different system configurations, e.g., different uplink-downlink configurations (block 2212). The first CC may be a PCC and the second CC may be an SCC for the UE. The PCC may be associated with more downlink subframes than the SCC. The UE may send first UCI on the first CC (block 2214). The UE may send second UCI on the second CC (block 2216).

In one design, the first UCI may be sent on the first CC and the second UCI may be sent on the second CC in the same subframe. The first UCI sent on the first CC may be applicable for downlink data transmission on the first CC. The second UCI sent on the second CC may be applicable for downlink data transmission on the second CC. In another design, the first UCI may be sent on the first CC in a first subframe, and the second UCI may be sent on the second CC in a second subframe different from the first subframe. The second subframe may be a downlink subframe for the first CC and an uplink subframe for the second CC.

The UE may receive an uplink grant on the first CC to schedule the UE for uplink data transmission on the second CC. The uplink grant may be sent on the first CC based on an uplink grant transmission timeline for the second CC. The UE may send uplink data transmission on the second CC. The UE may receive ACK/NACK for the uplink data transmission sent on the first CC in a subframe determined based on an ACK/NACK transmission timeline for the first CC.

Figure 23:
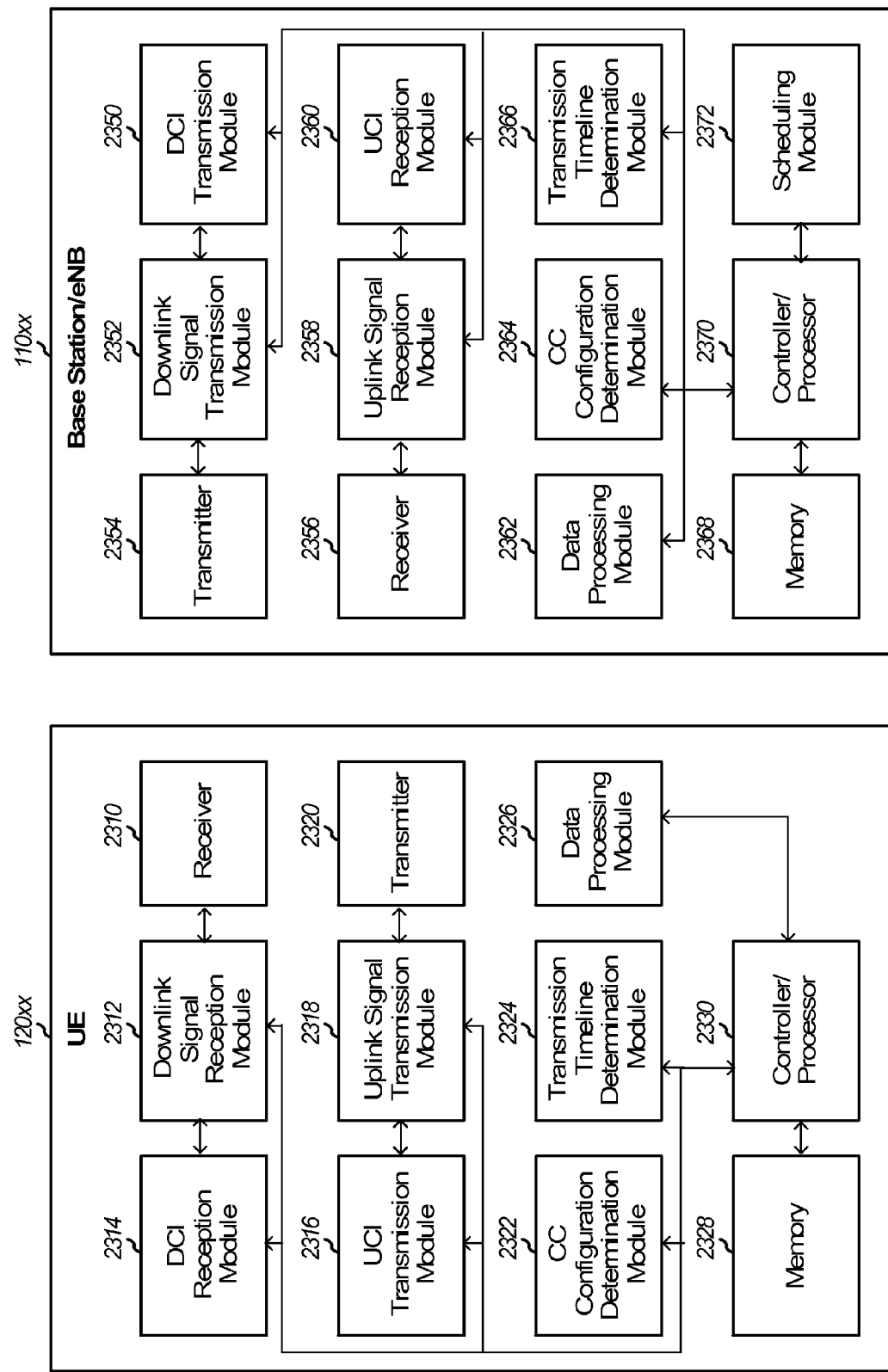
FIG. 23 shows a block diagram of a UE and a base station.

FIG. 23 shows a block diagram of a design of a UE 120xx and a base station/eNB 110xx, which may be one of the UEs and one of the eNBs in FIG. 1. Within UE 120xx, a receiver 2310 may receive signals transmitted by base stations, relays, etc. A module 2312 may process the received signal and provide decoded data and DCI. A module 2314 may process the decoded DCI and determine DCI intended for UE 120xx. Module 2312 and/or 2314 may process the DCI based on HARQ timelines (e.g., downlink grant and ACK/NACK transmission timelines) applicable for UE 120xx, which may be dependent on a CC configuration for UE 120xx. A module 2316 may generate UCI for transmission. A module 2318 may generate an uplink signal comprising data and/or UCI. A transmitter 2320 may condition and transmit the uplink signal. A module 2322 may determine a plurality of CCs configured for UE 120xx for carrier aggregation. A module 2324 may determine grant and ACK/NACK transmission timelines for UE 120xx based on the uplink-downlink configurations for the CCs configured for UE 120xx. The transmission timelines for UE 120xx may be used by module 2312 and/or 2314 to receive DCI and by module 2316 and/or 2318 to send UCI. A module 2326 may process data for downlink and uplink data transmissions. The various modules within UE 120xx may operate as described above. A controller/processor 2330 may direct the operation of various modules within UE 120xx. A memory 2328 may store data and program codes for UE 120xx.

Within base station 110xx, a module 2350 may generate DCI for transmission. A module 2352 may generate a downlink signal comprising data and/or DCI. A transmitter 2354 may condition and transmit the downlink signal. A receiver 2356 may receive signals transmitted by UEs. A module 2358 may process the received signal and provide decoded data and UCI. A module 2360 may process the decoded UCI and determine UCI sent by UE 120xx and other UEs. A module 2362 may process data for downlink and uplink data transmissions. A module 2364 may determine a plurality of CCs configured for UE 120xx for carrier aggregation. A module 2366 may determine grant and ACK/

NACK transmission timelines for UE 120xx based on the uplink-downlink configurations for the CCs configured for UE 120xx. The transmission timelines for UE 120xx may be used by module 2350 and/or 2352 to send DCI to UE 120xx and by module 2358 and/or 2360 to receive UCI from UE 120xx. The various modules within base station 110xx may operate as described above. A controller/processor 2370 may direct the operation of various modules within base station 110xx. A memory 2368 may store data and program codes for base station 110xx. A scheduling module 2372 may schedule UEs for data transmission on the downlink and/or uplink.

The modules in FIG. 23 may comprise processors, electronic devices, hardware devices, electronic components, logical circuits, memories, software/firmware codes, etc., or combinations thereof.

Figure 24:
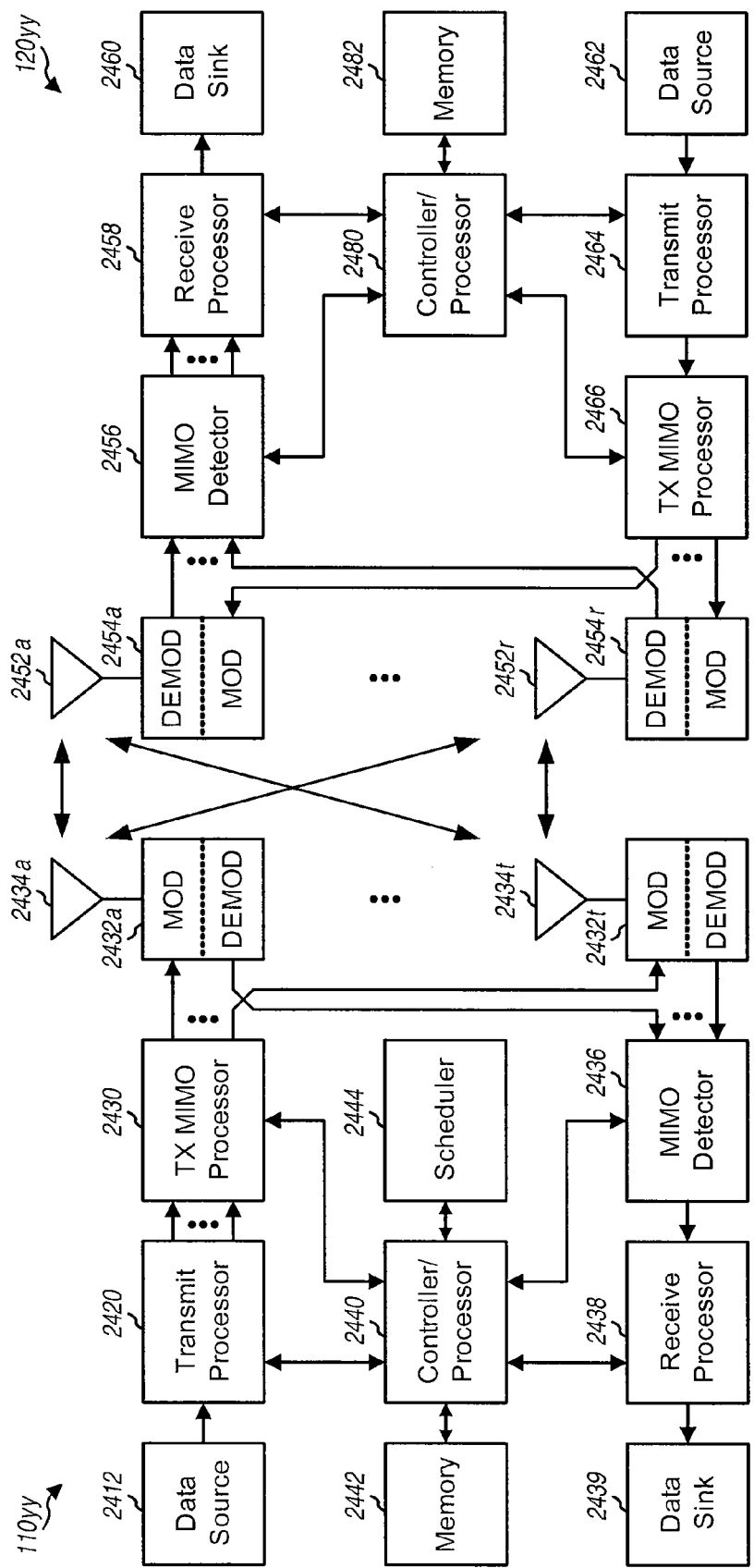
FIG. 24 shows another block diagram of a UE and a base station.

FIG. 24 shows a block diagram of a design of a base station/eNB 110yy and a UE 120yy, which may be one of the base stations/eNBs and one of the UEs in FIG. 1. Base station 110yy may be equipped with T antennas 2434a through 2434t, and UE 120yy may be equipped with R antennas 2452a through 2452r, where in general T≥1 and R≥1.

At base station 110yy, a transmit processor 2420 may receive data from a data source 2412 for transmission to one or more UEs on one or more CCs, process (e.g., encode and modulate) the data for each UE based on one or more modulation and coding schemes selected for that UE, and provide data symbols for all UEs. Transmit processor 2420 may also process DCI (e.g., downlink grants, uplink grants, ACK/NACK, configuration messages, etc.) and provide control symbols. Processor 2420 may also generate reference symbols for reference signals. A transmit (TX) multiple-input multiple-output (MIMO) processor 2430 may precode the data symbols, the control symbols, and/or the reference symbols (if applicable) and may provide T output symbol streams to T modulators (MOD) 2432a through 2432t. Each modulator 2432 may process its output symbol stream (e.g., for OFDM, etc.) to obtain an output sample stream. Each modulator 2432 may further condition (e.g., convert to analog, amplify, filter, and upconvert) its output sample stream to obtain a downlink signal. T downlink signals from modulators 2432a through 2432t may be transmitted via T antennas 2434a through 2434t, respectively.

At UE 120yy, antennas 2452a through 2452r may receive the downlink signals from base station 110yy and/or other base stations and may provide received signals to demodulators (DEMODs) 2454a through 2454r, respectively. Each demodulator 2454 may condition (e.g., filter, amplify, downconvert, and digitize) its received signal to obtain input samples. Each demodulator 2454 may further process the input samples (e.g., for OFDM, etc.) to obtain received symbols. A MIMO detector 2456 may obtain received symbols from all R demodulators 2454a through 2454r, perform MIMO detection on the received symbols if applicable, and provide detected symbols. A receive processor 2458 may process (e.g., demodulate and decode) the detected symbols, provide decoded data for UE 120yy to a data sink 2460, and provide decoded DCI to a controller/processor 2480.

On the uplink, at UE 120yy, a transmit processor 2464 may receive and process data from a data source 2462 and UCI (e.g., ACK/NACK, CSI, etc.) from controller/processor 2480. Processor 2464 may also generate reference symbols for one or more reference signals. The symbols from transmit processor 2464 may be precoded by a TX MIMO processor 2466 if applicable, further processed by modulators 2454a through 2454r (e.g., for SC-FDM, OFDM, etc.), and transmitted to base station 110yy. At base station 110yy, the uplink signals from UE 120yy and other UEs may be received by antennas 2434, processed by demodulators 2432, detected by a MIMO detector 2436 if applicable, and further processed by a receive processor 2438 to obtain decoded data and control information sent by UE 120yy and other UEs. Processor 2438 may provide the decoded data to a data sink 2439 and the decoded UCI to controller/processor 2440.

Controllers/processors 2440 and 2480 may direct the operation at base station 110yy and UE 120yy, respectively. Processor 2440 and/or other processors and modules at base station 110yy may perform or direct process 1100 in FIG. 11, process 1300 in FIG. 13, process 1500 in FIG. 15, process 1700 in FIG. 17, process 1900 in FIG. 19, process 2100 in FIG. 21, and/or other processes for the techniques described herein. Processor 2480 and/or other processors and modules at UE 120yy may perform or direct process 1200 in FIG. 12, process 1400 in FIG. 14, process 1600 in FIG. 16, process 1800 in FIG. 18, process 2000 in FIG. 20, process 2200 in FIG. 22, and/or other processes for the techniques described herein. Memories 2442 and 2482 may store data and program codes for base station 110yy and UE 120yy, respectively. A scheduler 2444 may schedule UEs for data transmissions on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or combinations thereof. A software/firmware module may reside in random access memory (RAM), flash memory, read only memory (ROM), erasable programmable ROM (EPROM), electrically EPROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. The computer-readable medium may be a non-transitory computer-readable medium. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. The computer-readable medium may be embodied in a computer program product. By way of example, a computer program product may include a computer-readable medium in packaging materials. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
identifying a first component carrier (CC) and a second CC configured for a user equipment (UE) for carrier aggregation, the first CC and the second CC being associated with different system configurations, wherein the different system configurations comprise different uplink-downlink configurations;
sending a data transmission on the second CC to the UE; and
receiving uplink control information (UCI) for the data transmission sent on the second CC, the UCI being for the second CC and being sent on the first CC by the UE based on a Hybrid Automatic Repeat Request (HARQ) timeline, wherein the HARQ timeline is based on the different uplink-downlink configurations.

2. The method of claim 1, wherein the first CC is a primary CC (PCC) and the second CC is a secondary CC (SCC) for the UE.

3. The method of claim 1, wherein the first CC is associated with a first uplink-downlink configuration and the second CC is associated with a second uplink-downlink configuration, and wherein the HARQ timeline is determined further based on the first uplink-downlink configuration for the first CC or based on the second uplink-downlink configuration for the second CC.

4. The method of claim 1, wherein the first CC is associated with more downlink subframes than the second CC, and wherein the HARQ timeline is further based on a HARQ timeline for the first CC.

5. The method of claim 1, wherein the UCI comprises acknowledgement/negative acknowledgement (ACK/NACK) for the data transmission sent on the second CC to the UE.

6. The method of claim 5, wherein the ACK/NACK is sent by the UE based on Physical Uplink Control Channel (PUCCH) format 1b with channel selection, and wherein a mapping table for the ACK/NACK is determined based on a largest number of downlink subframes associated with a single uplink subframe for all CCs configured for the UE.

7. The method of claim 1, wherein the UCI comprises channel state information (CSI) sent by the UE based on a CSI configuration for the UE.

8. The method of claim 1, further comprising:
periodically receiving channel state information (CSI) for the second CC from the UE, the CSI being sent by the UE at a periodicity determined based on the uplink-downlink configuration for the first CC.

9. The method of claim 1, further comprising:
sending a downlink grant on the first CC to schedule the UE for the data transmission on the second CC, the downlink grant being for the second CC and being sent based on a downlink grant transmission timeline, wherein the HARQ timeline is based on the different uplink-downlink configurations.

10. The method of claim 1, further comprising:
sending an uplink grant to schedule the UE for uplink data transmission on the first CC or the second CC, the uplink grant being sent on the first CC based on an uplink grant transmission timeline, wherein HARQ timeline is based on the different uplink-downlink configurations.

11. The method of claim 1, further comprising:
sending an uplink grant to schedule the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations for the first CC and the second CC and the other uplink-downlink configuration for the third CC.

12. The method of claim 1, further comprising:
receiving uplink data transmission on the second CC from the UE;
determining acknowledgement/negative acknowledgement (ACK/NACK) for the uplink data transmission on the second CC; and
sending the ACK/NACK on the first CC in a subframe determined based on a downlink ACK/NACK transmission timeline, wherein the ACK/NACK transmission timeline is based on the different uplink-downlink configurations.

13. The method of claim 1, wherein the different system configurations comprise a time divisional duplexing (TDD) system and a frequency division duplexing (FDD) system.

14. An apparatus for wireless communication, comprising:
means for identifying a first component carrier (CC) and a second CC configured for a user equipment (UE) for carrier aggregation, the first CC and the second CC being associated with different system configurations, wherein the different system configurations comprise different uplink-downlink configurations;
means for sending a data transmission on the second CC to the UE; and
means for receiving uplink control information (UCI) for the data transmission sent on the second CC, the UCI being for the second CC and being sent on the first CC by the UE based on a Hybrid Automatic Repeat Request (HARQ) timeline, wherein the HARQ timeline is based on the different uplink-downlink configurations.

15. The apparatus of claim 14, further comprising:
means for sending an uplink grant to schedule the UE for uplink data transmission on the first CC or the second CC, the uplink grant being sent on the first CC based on an uplink grant transmission timeline, wherein the HARQ timeline is based on the different uplink-downlink configurations.

16. The apparatus of claim 14, further comprising:
means for sending an uplink grant to schedule the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations for the first CC and the second CC and the other uplink-downlink configuration for the third CC.

17. The apparatus of claim 14, further comprising:
means for receiving uplink data transmission on the second CC from the UE;
means for determining acknowledgement/negative acknowledgement (ACK/NACK) for the uplink data transmission on the second CC; and
means for sending the ACK/NACK on the first CC in a subframe determined based on a downlink ACK/NACK transmission timeline, wherein the ACK/NACK transmission timeline is based on the different uplink-downlink configurations.

18. The apparatus of claim 14, wherein the different system configurations comprise a time divisional duplexing (TDD) system and a frequency division duplexing (FDD) system.

19. An apparatus for wireless communication, comprising:
at least one processor configured to:
identify a first component carrier (CC) and a second CC configured for a user equipment (UE) for carrier aggregation, the first CC and second the CC being associated with different system configurations, wherein the different system configurations comprise different uplink-downlink configurations;
send a data transmission on the second CC to the UE; and
receive uplink control information (UCI) for the data transmission sent on the second CC, the UCI being for the second CC and being sent on the first CC by the UE based on a Hybrid Automatic Repeat Request (HARQ) timeline for the first CC, wherein the HARQ timeline is based on the different uplink-downlink configurations; and
a memory coupled with the at least one processor.

20. The apparatus of claim 19, wherein the at least one processor is further configured to send an uplink grant to schedule the UE for uplink data transmission on the first CC or the second CC, the uplink grant being sent on the first CC based on an uplink grant transmission timeline, wherein the uplink grant transmission timeline is based on the different uplink-downlink configurations.

21. The apparatus of claim 19, wherein the at least one processor is further configured to send an uplink grant to schedule the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations first the first CC and the second CC and the other uplink-downlink configuration for the third CC.

22. The apparatus of claim 19, wherein the at least one processor is further configured to:
receive uplink data transmission on the second CC from the UE;
determine acknowledgement/negative acknowledgement (ACK/NACK) for the uplink data transmission on the second CC; and
send the ACK/NACK on the first CC in a subframe determined based on a downlink ACK/NACK transmission timeline, wherein the ACK/NACK transmission timeline is based on the different uplink-downlink configurations.

23. The apparatus of claim 19, wherein the different system configurations comprise a time divisional duplexing (TDD) system and a frequency division duplexing (FDD) system.

24. A non-transitory computer-readable medium comprising:
code for causing at least one processor to identify a first component carrier (CC) and a second CC configured for a user equipment (UE) for carrier aggregation, the first CC and the second CC being associated with different system configurations, wherein the different system configurations comprise different uplink-downlink configurations;
code for causing the at least one processor to send a data transmission on the second CC to the UE; and
code for causing the at least one processor to receive uplink control information (UCI) for the data transmission sent on the second CC, the UCI being for the second CC and being sent on the first CC by the UE based on a Hybrid Automatic Repeat Request (HARQ) timeline, wherein the HARQ timeline is based on the different uplink-downlink configurations.

25. The non-transitory computer-readable medium of claim 24, wherein the different system configurations comprise a time divisional duplexing (TDD) system and a frequency division duplexing (FDD) system.

26. A method for wireless communication, comprising:
determining a first component carrier (CC) and a second CC configured for a user equipment (UE) for carrier aggregation, the first CC and the second CC being associated with different system configurations, wherein the different system configurations comprise different uplink-downlink configurations;
receiving a data transmission on the second CC; and
sending uplink control information (UCI) for the data transmission sent on the second CC, the UCI being for the second CC and being sent on the first CC based on a Hybrid Automatic Repeat Request (HARQ) timeline, wherein the HARQ timeline is based on the different uplink-downlink configurations.

27. The method of claim 26, wherein the UCI comprises acknowledgement/negative acknowledgement (ACK/NACK) for the data transmission sent on the second CC to the UE.

28. The method of claim 26, further comprising:
receiving a downlink grant sent on the first CC to schedule the UE for the data transmission on the second CC, the downlink grant being for the second CC and being sent based on a downlink grant transmission timeline, wherein the downlink grant transmission timeline is based on the different uplink-downlink configurations.

29. The method of claim 26, further comprising:
receiving an uplink grant scheduling the UE for uplink data transmission on the first CC or the second CC, the uplink grant being sent on the first CC based on an uplink grant transmission timeline, wherein the uplink grant transmission timeline is based on the different uplink-downlink configurations.

30. The method of claim 26, further comprising:
receiving an uplink grant scheduling the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations first the first CC and the second CC and the other uplink-downlink configuration for the third CC.

31. The method of claim 26, further comprising:
sending uplink data transmission on the second CC by the UE; and
receiving acknowledgement/negative acknowledgement (ACK/NACK) for the uplink data transmission on the second CC, the ACK/NACK being sent on the first CC in a subframe determined based on a downlink ACK/NACK transmission timeline, wherein the ACK/NACK transmission timeline is based on the different uplink-downlink configurations.

32. The method of claim 26, wherein the different system configurations comprise a time divisional duplexing (TDD) system and a frequency division duplexing (FDD) system.

33. The method of claim 26, wherein the first CC is a primary CC, and the second CC is a secondary CC for the UE.

34. The method of claim 26, wherein the first CC is associated with more downlink subframes than the second CC, and wherein the HARQ timeline is further based on a HARQ timeline for the first CC.

35. An apparatus for wireless communication, comprising:
means for determining a first component carrier (CC) and a second CC configured for a user equipment (UE) for carrier aggregation, the first CC and the second CC being associated with different system configurations, wherein the different system configurations comprise different uplink-downlink configurations;
means for receiving a data transmission on the second CC; and
means for sending uplink control information (UCI) for the data transmission received on the second CC, the UCI being for the second CC and being sent on the first CC based on a Hybrid Automatic Repeat Request (HARQ) timeline, wherein the HARQ timeline is based on the different uplink-downlink configurations.

36. The apparatus of claim 35, further comprising:
means for receiving an uplink grant scheduling the UE for uplink data transmission on the first CC or the second CC, the uplink grant being sent on the first CC based on an uplink grant transmission timeline, wherein the uplink grant transmission timeline is based on the different uplink-downlink configurations.

37. The apparatus of claim 35, further comprising:
means for receiving an uplink grant scheduling the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations for the first CC and the second CC and the other uplink-downlink configuration for the third CC.

38. The apparatus of claim 35, further comprising:
means for sending uplink data transmission on the second CC by the UE; and
means for receiving acknowledgement/negative acknowledgement (ACK/NACK) for the uplink data transmission on the second CC, the ACK/NACK being sent on the first CC in a subframe determined based on a downlink ACK/NACK transmission timeline, wherein the ACK/NACK transmission timeline is based on the different uplink-downlink configurations.

39. The apparatus of claim 35, wherein the different system configurations comprise a time divisional duplexing (TDD) system and a frequency division duplexing (FDD) system.

40. An apparatus for wireless communication, comprising:
at least one processor configured to:
determine a first component carrier (CC) and a second CC configured for a user equipment (UE) for carrier aggregation, the first CC and the second CC being associated with different system configurations, wherein the different system configurations comprise different uplink-downlink configurations;
receive a data transmission on the second CC; and
send uplink control information (UCI) for the data transmission received on the second CC, the UCI being for the second CC and being sent on the first CC based on a Hybrid Automatic Repeat Request (HARQ) timeline, wherein the HARQ timeline is based on the different uplink-downlink configurations; and
a memory coupled with the at least one processor.

41. The apparatus of claim 40, wherein the at least one processor is further configured to receive an uplink grant scheduling the UE for uplink data transmission on the first CC or the second CC, the uplink grant being sent on the first CC based on an uplink grant transmission timeline, wherein the uplink grant transmission timeline is based on the different uplink-downlink configurations.

42. The apparatus of claim 40, wherein the at least one processor is further configured to receive an uplink grant scheduling the UE for uplink data transmission on the second CC, the uplink grant being sent on the first CC or a third CC based on an uplink grant transmission timeline, wherein the third CC is associated with an uplink-downlink configuration wherein the uplink grant transmission timeline is based on the different uplink-downlink configurations first the first CC and the second CC and the other uplink-downlink configuration for the third CC.

43. The apparatus of claim 40, wherein the at least one processor is further configured to:
send uplink data transmission on the second CC by the UE; and
receive acknowledgement/negative acknowledgement (ACK/NACK) for the uplink data transmission on the second CC, the ACK/NACK being sent on the first CC in a subframe determined based on a downlink ACK/NACK transmission timeline, wherein the ACK/NACK transmission timeline is based on the different uplink-downlink configurations.

44. The apparatus of claim 40, wherein the different system configurations comprise a time divisional duplexing (TDD) system and a frequency division duplexing (FDD) system.

45. A non-transitory computer-readable medium comprising:
code for causing at least one processor to determine a first component carrier (CC) and a second CC configured for a user equipment (UE) for carrier aggregation, the first CC and the second CC being associated with different system configurations, wherein the different system configurations comprise different uplink-downlink configurations;
code for causing the at least one processor to receive a data transmission on the second CC; and
code for causing the at least one processor to send uplink control information (UCI) for the data transmission received on the second CC, the UCI being for the second CC and being sent on the first CC based on a Hybrid Automatic Repeat Request (HARQ) timeline, wherein the HARQ timeline is based on the different uplink-downlink configurations.

46. The non-transitory computer-readable medium of claim 45, wherein the different system configurations comprise a time divisional duplexing (TDD) system and a frequency division duplexing (FDD) system.

47. A method for wireless communication, comprising:
identifying a first component carrier (CC) and a second CC configured for a user equipment (UE) for carrier aggregation, the first CC and the second CC being associated with different system configurations, wherein the different system configurations comprise different uplink-downlink configurations;
sending an uplink grant on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
sending an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

48. The method of claim 47, wherein the first CC is a primary CC for the UE and the second CC is a secondary CC for the UE.

49. The method of claim 47, wherein the first CC is associated with a first uplink-downlink configuration and the second CC is associated with a second uplink-downlink configuration, and wherein the uplink grant transmission timeline is determined based on the first uplink-downlink configuration for the first CC or based on the second uplink-downlink configuration for the second CC.

50. The method of claim 47, wherein the first CC is associated with more uplink subframes than the second CC, and wherein the uplink transmission timeline is further based on the uplink grant transmission timeline for the first CC.

51. The method of claim 47, further comprising:
receiving uplink data transmission sent on the second CC by the UE based on the uplink grant; and
determining the ACK/NACK for the uplink data transmission.

52. The method of claim 51, wherein the determined subframe is a subframe in which the ACK/NACK can be sent on the first CC based on the different uplink-downlink configurations.

53. The method of claim 47, further comprising:
sending a second uplink grant on the first CC to schedule the UE for uplink data transmission on the first CC, the second uplink grant being for the first CC and being sent based on the uplink grant transmission timeline.

54. The method of claim 47, wherein the different system configurations comprise a time divisional duplexing (TDD) system and a frequency division duplexing (FDD) system.

55. An apparatus for wireless communication, comprising:
means for identifying a first component carrier (CC) and a second CC configured for a user equipment (UE) for carrier aggregation, the first CC and the second CC being associated with different system configurations, wherein the different system configurations comprise different uplink-downlink configurations;
means for sending an uplink grant on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
means for sending an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

56. The apparatus of claim 55, further comprising:
means for receiving uplink data transmission sent on the second CC by the UE based on the uplink grant; and
means for determining the ACK/NACK for the uplink data transmission.

57. The apparatus of claim 55, further comprising:
means for sending a second uplink grant on the first CC to schedule the UE for uplink data transmission on the first CC, the second uplink grant being for the first CC and being sent based on the uplink grant transmission timeline.

58. The apparatus of claim 55, wherein the different system configurations comprise a time divisional duplexing (TDD) system and a frequency division duplexing (FDD) system.

59. An apparatus for wireless communication, comprising:
at least one processor configured to:
identify a first component carrier (CC) and a second CC configured for a user equipment (UE) for carrier aggregation, the first CC and the second CC being associated with different system configurations, wherein the different system configurations comprise different uplink-downlink configurations;
send an uplink grant on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
send an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations; and
a memory coupled with the at least one processor.

60. The apparatus of claim 59, wherein the at least one processor is further configured to:
receive uplink data transmission sent on the second CC by the UE based on the uplink grant; and
determine the ACK/NACK for the uplink data transmission.

61. The apparatus of claim 59, wherein the at least one processor is further configured to send a second uplink grant on the first CC to schedule the UE for uplink data transmission on the first CC, the second uplink grant being for the first CC and being sent based on the uplink grant transmission timeline.

62. The apparatus of claim 59, wherein the different system configurations comprise a time divisional duplexing (TDD) system and a frequency division duplexing (FDD) system.

63. A non-transitory computer-readable medium comprising:
code for causing at least one processor to identify a first component carrier (CC) and a second CC configured for a user equipment (UE) for carrier aggregation, the first CC and the second CC being associated with different system configurations, wherein the different system configurations comprise different uplink-downlink configurations;
code for causing the at least one processor to send an uplink grant on the first CC to schedule the UE for uplink data transmission on the second CC, the uplink grant being for the second CC and being sent on the first CC based on an uplink grant transmission timeline, wherein the uplink grant transmission timeline is based the different uplink-downlink configurations; and
code for causing the at least one processor to send an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

64. The non-transitory computer-readable medium of claim 63, wherein the different system configurations comprise a time divisional duplexing (TDD) system and a frequency division duplexing (FDD) system.

65. A method for wireless communication, comprising:
determining a first component carrier (CC) and a second CC configured for a user equipment (UE) for carrier aggregation, the first CC and the second CC being associated with different system configurations, wherein the different system configurations comprise different uplink-downlink configurations;
receiving an uplink grant sent on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
receiving an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

66. The method of claim 65, further comprising:
sending uplink data transmission on the second CC based on the uplink grant.

67. The method of claim 65, further comprising:
receiving a second uplink grant sent on the first CC to schedule the UE for uplink data transmission on the first CC, the second uplink grant being for the first CC and being sent based on the uplink grant transmission timeline.

68. The method of claim 65, wherein the different system configurations comprise a time divisional duplexing (TDD) system and a frequency division duplexing (FDD) system.

69. An apparatus for wireless communication, comprising:
means for determining a first component carrier (CC) and a second CC configured for a user equipment (UE) for carrier aggregation, the first CC and the second CC being associated with different system configurations, wherein the different system configurations comprise different uplink-downlink configurations;
means for receiving an uplink grant sent on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
means for receiving an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

70. The apparatus of claim 69, further comprising:
means for sending uplink data transmission on the second CC based on the uplink grant.

71. The apparatus of claim 69, further comprising:
means for receiving a second uplink grant sent on the first CC to schedule the UE for uplink data transmission on the first CC, the second uplink grant being for the first CC and being sent based on the uplink grant transmission timeline.

72. The apparatus of claim 69, wherein the different system configurations comprise a time divisional duplexing (TDD) system and a frequency division duplexing (FDD) system.

73. An apparatus for wireless communication, comprising:
    at least one processor configured to:
        determine a first component carrier (CC) and a second CC configured for a user equipment (UE) for carrier aggregation, the first CC and the second CC being associated with different system configurations, wherein the different system configurations comprise different uplink-downlink configurations;
        receive an uplink grant sent on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
        receive an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations; and
    a memory coupled with the at least one processor.

74. The apparatus of claim 73, wherein the at least one processor is further configured to:
    send uplink data transmission on the second CC based on the uplink grant.

75. The apparatus of claim 73, wherein the at least one processor is further configured to receive a second uplink grant sent on the first CC to schedule the UE for uplink data transmission on the first CC, the second uplink grant being for the first CC and being sent based on the uplink grant transmission timeline.

76. The apparatus of claim 73, wherein the different system configurations comprise a time divisional duplexing (TDD) system and a frequency division duplexing (FDD) system.

77. A non-transitory computer-readable medium comprising:
    code for causing at least one processor to determine a first component carrier (CC) and a second CC configured for a user equipment (UE) for carrier aggregation, the first CC and the second CC being associated with different system configurations, wherein the different system configurations comprise different uplink-downlink configurations;
    code for causing the at least one processor to receive an uplink grant sent on the first CC to schedule the UE for uplink data transmission on the second CC, the uplink grant being for the second CC and being sent on the first CC based on an uplink grant transmission timeline, wherein the uplink grant transmission timeline is based on the different uplink-downlink configurations; and
    code for causing the at least one processor to receive an acknowledgement/negative acknowledgement (ACK/NACK) on the first CC in a subframe determined based on a Hybrid Automatic Repeat Request (HARQ) timeline, wherein the HARQ timeline is based on the different uplink-downlink configurations.

78. The non-transitory computer-readable medium of claim 77, wherein the different system configurations comprise a time divisional duplexing (TDD) system and a frequency division duplexing (FDD) system.

* * * * *